United States Patent
Fraser et al.

(10) Patent No.: US 12,467,929 B2
(45) Date of Patent: Nov. 11, 2025

(54) METHODS OF DETECTING UBE3A PROTEIN

(71) Applicant: Biogen MA Inc., Cambridge, MA (US)

(72) Inventors: Kyle Bradley Fraser, Cambridge, MA (US); Omar Sharif Mabrouk, Brookline, MA (US); Danielle LeeZetta Graham, Concord, MA (US)

(73) Assignee: Biogen MA Inc., Cambridge, MA (US)

( * ) Notice: Subject to any disclaimer, the term of this patent is extended or adjusted under 35 U.S.C. 154(b) by 504 days.

(21) Appl. No.: 17/921,165

(22) PCT Filed: Apr. 26, 2021

(86) PCT No.: PCT/US2021/029172
§ 371 (c)(1),
(2) Date: Oct. 25, 2022

(87) PCT Pub. No.: WO2021/222109
PCT Pub. Date: Nov. 4, 2021

(65) Prior Publication Data
US 2023/0184780 A1    Jun. 15, 2023

Related U.S. Application Data

(60) Provisional application No. 63/015,991, filed on Apr. 27, 2020.

(51) Int. Cl.
| | | |
|---|---|---|
| *G01N 33/68* | (2006.01) |
| *A61K 31/7125* | (2006.01) |
| *C12N 9/00* | (2006.01) |
| *G01N 1/28* | (2006.01) |

(52) U.S. Cl.
CPC ..... *G01N 33/6848* (2013.01); *A61K 31/7125* (2013.01); *C12N 9/93* (2013.01); *G01N 1/28* (2013.01); *C12Y 603/02019* (2013.01); *G01N 2800/28* (2013.01)

(58) Field of Classification Search
None
See application file for complete search history.

(56) References Cited

PUBLICATIONS

Clayton-Smith et al., "Angelman Syndrome: a review of the clinical and genetic aspects," J. Med. Genet., Feb. 2003, 40(2):87-95.
Gentile et al., "A neurodevelopmental survey of Angelman syndrome with genotype-phenotype correlations," J. Dev. Behav. Pediatr., Sep. 2010, 31(7): 592-601.
International Preliminary Report on Patentability in International Application No. PCT/US2021/029172, mailed on Nov. 10, 2022, 8 pages.
International Search Report and Written Opinion in International Application No. PCT/US2021/029172, mailed on Aug. 16, 2021, 14 pages.
Kishino et al., "UBE3A/E6-AP mutations cause Angelman syndrome," Nature Genetics, Jan. 1997, 15(1):70-73.

(Continued)

*Primary Examiner* — Xiaoyun R Xu
(74) *Attorney, Agent, or Firm* — Fish & Richardson P.C.

(57) ABSTRACT

The present disclosure provides a method of detecting the presence or amount of a UBE3A protein in a sample, such as a human sample, using mass spectrometry based techniques. The methods described herein are useful for diagnosing Angelman syndrome, as well as monitoring disease progression and treatment effectiveness.

20 Claims, 8 Drawing Sheets
Specification includes a Sequence Listing.

(56) References Cited

PUBLICATIONS

Margolis et al., "Angelman Syndrome," Neurotherapeutics, Jun. 2015, 12(3):641-650.

Martinez-Noel et al., "Identification and Proteomic Analysis of Distinct UBE3A/E6AP Protein Complexes," Molecular and Cellular Biology, Aug. 2012, 32(15):3095-3106.

Matsuura et al., "De novo truncating mutations in E6-AP ubiquitin-protein ligase gene (UBE3A) in Angelman syndrome," Nature Genetics, 1997, 15:74-77.

Valente et al., "Angelman syndrome caused by deletion: A genotype-phenotype correlation determined by breakpoint," Epilepsy Research, Jul. 2013, 105(1-2):234-239.

Yi Jason et al., "The autism-linked UBE3A T385A mutant E3 ubiquitin ligase activates the Wnt/[beta]-catenin pathway by inhibiting the proteasome," Journal of Biological Chemistry, Jul. 2017, 292(31):12503-12515.

METHODS OF DETECTING UBE3A PROTEIN

CROSS-REFERENCE TO RELATED APPLICATIONS

This application is a § 371 U.S. National Application of International Application No. PCT/US2021/029172 filed Apr. 26, 2021, which claims priority to U.S. Provisional Application 63/015,991, filed Apr. 27, 2020. The content of each foregoing application is incorporated by reference herein in its entirety.

SEQUENCE LISTING

This application contaijns a Sequence Listing which has been submitted electronically in ASCII format and is hereby incorporated by reference in its entirety. Said ASCII copy, created on Aug, 8, 2025, is named 13751-0329US1_sl.txt and is 50,490 bytes in size.

BACKGROUND

Angelman Syndrome is a genetic disorder caused by deficiency of the maternal UBE3A gene. Loss of UBE3A leads to a clinical presentation consistent with central nervous system dysfunction and is characterized by intellectual disability, developmental delay, speech impairment, seizures and ataxia. An obstacle to the development of effective therapies for treating Angelman syndrome is the lack of methods for monitoring UBE3A levels in human samples.

SUMMARY

In one aspect, provided herein are methods of detecting the presence or amount of a UBE3A protein in a sample, the methods include: contacting the sample with an antibody that binds to the UBE3A protein; removing from the sample some or all of the proteins that are not bound to the antibody, resulting in a purified protein preparation; subjecting the purified protein preparation to enzymatic digestion, resulting in a digested peptide preparation; and determining via mass spectrometry the presence or amount of one or more UBE3A peptides in the digested peptide preparation, thereby identifying the presence or amount of the UBE3A protein in the sample.

In some embodiments, the one or more UBE3A peptides include at least one peptide selected from the peptides depicted in Table 17. In some embodiments, the one or more UBE3A peptides include at least one peptide selected from the group consisting of: VFSSAEALVQSFR (SEQ ID NO:3), NLVNDDDAIVAASK (SEQ ID NO:4), VDPLETELGVK (SEQ ID NO:5), and LEMIAMENPADLKK (SEQ ID NO:6). In some embodiments, the methods include detecting one peptide selected from the group consisting of: VFSSAEALVQSFR (SEQ ID NO:3), NLVNDDAIVAASK (SEQ ID NO:4), VDPLETELGVK (SEQ ID NO:5), and LEMIAMENPADLKK (SEQ ID NO:6). In some embodiments, the methods include detecting two or more peptides selected from the group consisting of: VFSSAEALVQSFR (SEQ ID NO:3), NLVNDDDAIVAASK (SEQ ID NO:4), VDPLETELGVK (SEQ ID NO:5), and LEMIAMENPADLKK (SEQ ID NO:6). In some embodiments, the methods include detecting peptides VFSSAEALVQSFR (SEQ ID NO:3), NLVNDDDAIVAASK (SEQ ID NO:4), VDPLETELGVK (SEQ ID NO:5), and LEMIAMENPADLKK (SEQ ID NO:6). In some embodiments, the methods further include detecting one or more additional UBE3A peptides in the digested peptide preparation. In some embodiments, enzymatic digestion comprises contacting the purified protein preparation with trypsin. In some embodiments, the antibody that binds to the UBE3A protein competes with the 3E5 antibody for binding to the UBE3A protein. In some embodiments, the antibody that binds to the UBE3A protein comprises the 3E5 antibody. In some embodiments, the antibody that binds to the UBE3A protein is conjugated to beads. In some embodiments, the ratio by volume between the beads and the sample is between about 1:30 to about 1:80. In some embodiments, the ratio by volume between the beads and the sample is between about 1:40 to about 1:60. In some embodiments, the sample includes about 400 pg/mL or less of the UBE3A protein. In some embodiments, the sample includes about 100 pg/mL or less of the UBE3A protein. In some embodiments, the sample includes about 20 pg/mL or less of the UBE3A protein. In some embodiments, the sample includes about 1 to about 20 pg/mL of the UBE3A protein. In some embodiments, the sample includes about 1 to about 10 pg/mL of the UBE3A protein. In some embodiments, the sample includes about 1 to about 5 pg/mL of the UBE3A protein. In some embodiments, the sample is a human sample. In some embodiments, the sample is a cerebrospinal fluid (CSF) sample. In some embodiments, the sample is a human CSF sample. In some embodiments, the sample is a human CSF sample obtained from a human subject with Angelman syndrome or at risk of developing Angelman syndrome. In some embodiments, identifying the sample as having an undetectable level of the UBE3A protein, a level of the UBE3A protein reduced as compared to healthy subjects, or a level of the UBE3A protein within the range found in subjects with Angelman syndrome identifies a human subject from whom the sample was obtained as having Angelman syndrome or at risk of developing Angelman syndrome.

In another aspect, provided herein are methods of treating a human subject that has Angelman syndrome or is at risk of developing Angelman syndrome, the methods include: identifying the human subject as having Angelman syndrome or being at risk of developing Angelman syndrome according to any of the above embodiments; and administering to the human subject a therapeutic.

In another aspect, provided herein are methods for determining if a therapeutic administered to a human subject that has Angelman syndrome or is at risk of developing Angelman syndrome is an efficacious therapeutic, the methods include: administering one or more doses of the therapeutic to the human subject; and measuring, according to any of the methods of detecting the presence or amount of a UBE3A protein in a sample in the above embodiments, a UBE3A protein level in a biological sample obtained from the human subject after administering the one or more doses of the therapeutic, wherein if the UBE3A protein level in the biological sample is higher than the range of UBE3A protein level found in subjects with Angelman syndrome then the therapeutic is identified as being an efficacious therapeutic.

In another aspect, provided herein are methods for determining if a therapeutic administered to a human subject that has Angelman syndrome or is at risk of developing Angelman syndrome is an efficacious therapeutic, the methods include: measuring, according to any of the methods of detecting the presence or amount of a UBE3A protein in a sample in the above embodiments, a UBE3A protein level in a first biological sample obtained from the human subject; administering one or more doses of the therapeutic to the human subject; and measuring, according to any of the methods of detecting the presence or amount of a UBE3A protein in a sample in the above embodiments, a UBE3A protein level in a second biological sample obtained from the human subject after administering the one or more doses of the therapeutic, wherein if the UBE3A protein level in the second biological sample is higher than the UBE3A protein level in the first biological sample then the therapeutic is identified as being an efficacious therapeutic.

In another aspect, provided herein are methods of treating a human subject that has Angelman syndrome or is at risk of developing Angelman syndrome, the methods include: administering initial doses of a therapeutic to the human subject, wherein each of the initial doses is in the same amount and is administered at the same dosing interval between doses; measuring, according to any of the methods of detecting the presence or amount of a UBE3A protein in a sample in the above embodiments, a UBE3A protein level in a first biological sample obtained from the human subject after administering the initial doses that is higher than (i) a UBE3A protein level measured in a second biological sample obtained from the human subject prior to administering the initial doses, or (ii) the range of UBE3A protein level found in subjects with Angelman syndrome; and administering further doses of the therapeutic to the human subject, wherein each of the further doses is in the same or lesser amount and at the same or lengthened dosing interval as compared to the initial doses.

In another aspect, provided herein are methods of treating a human subject that has Angelman syndrome or is at risk of developing Angelman syndrome, the methods include: administering initial doses of a therapeutic to the human subject, wherein each of the initial doses is in the same amount and is administered at the same dosing interval between doses; measuring, according to any of the methods of detecting the presence or amount of a UBE3A protein in a sample in the above embodiments, a UBE3A protein level in a first biological sample obtained from the human subject after administering the initial doses that is equal to or higher than a pre-determined threshold UBE3A protein level; and administering further doses of the therapeutic to the human subject, wherein each of the further doses is in the same or lesser amount and at the same or lengthened dosing interval as compared to the initial doses.

In another aspect, provided herein are methods of treating a human subject that has Angelman syndrome or is at risk of developing Angelman syndrome, the methods include: administering initial doses of a therapeutic to the human subject, wherein each of the initial doses is in the same amount and is administered at the same dosing interval between doses; measuring, according to any of the methods of detecting the presence or amount of a UBE3A protein in a sample in the above embodiments, a UBE3A protein level in a first biological sample obtained from the human subject after administering the initial doses that is higher than (i) a UBE3A protein level measured in a second biological sample obtained from the human subject prior to administering the initial doses, or (ii) the range of UBE3A protein level found in subjects with Angelman syndrome, but equal to or lower than a pre-determined threshold UBE3A protein level; and administering further doses of the therapeutic to the human subject, wherein each of the further doses is in an increased amount and/or at a shortened dosing interval as compared to the initial doses.

In a further aspect, provided herein are methods of treating a human subject that has Angelman syndrome or is at risk of developing Angelman syndrome, the methods include: administering initial doses of a therapeutic to the human subject, wherein each of the initial doses is in the same amount and is administered at the same dosing interval between doses; measuring, according to any of the methods of detecting the presence or amount of a UBE3A protein in a sample in the above embodiments, a UBE3A protein level in a first biological sample obtained from the human subject after administering the initial doses that is equal to or lower than (i) a UBE3A protein level measured in a second biological sample obtained from the human subject prior to administering the initial doses, or (ii) the range of UBE3A protein level found in subjects with Angelman syndrome; and administering further doses of the therapeutic to the human subject, wherein each of the further doses is in an increased amount and/or at a shortened dosing interval as compared to the initial doses.

In a further aspect, provided herein are methods of treating a human subject that has Angelman syndrome or is at risk of developing Angelman syndrome, the methods include: administering initial doses of a therapeutic to the human subject, wherein each of the initial doses is in the same amount and is administered at the same dosing interval between doses; measuring, according to any of the methods of detecting the presence or amount of a UBE3A protein in a sample in the above embodiments, a UBE3A protein level in a first biological sample obtained from the human subject after administering the initial doses that is equal to or lower than a pre-determined threshold UBE3A protein level; and administering further doses of the therapeutic to the human subject, wherein each of the further doses is in an increased amount and/or at a shortened dosing interval as compared to the initial doses.

In some embodiments of any of the methods of treating a human subject that has Angelman syndrome or is at risk of developing Angelman syndrome or determining if a therapeutic administered to a human subject that has Angelman syndrome or is at risk of developing Angelman syndrome is an efficacious therapeutic, the therapeutic is an antisense oligonucleotide that reduces the level of UBE3A antisense transcript (UBE3A-ATS). In some embodiments, the antisense oligonucleotide is administered to the human subject via intrathecal injection.

Unless otherwise defined, all technical and scientific terms used herein have the same meaning as commonly understood by one of ordinary skill in the art to which the invention belongs. The methods and materials described herein are exemplary, and methods and materials similar or equivalent to those described herein can be used in the practice or testing of the present invention. All publications, patent applications, patents, and other references mentioned herein are incorporated by reference in their entirety. In case of conflict, the present application, including definitions, will control. The materials, methods, and examples are illustrative only and not intended to be limiting.

Other features and advantages of the invention will be apparent from the following detailed description and from the claims.

DETAILED DESCRIPTION

Figure 1A:
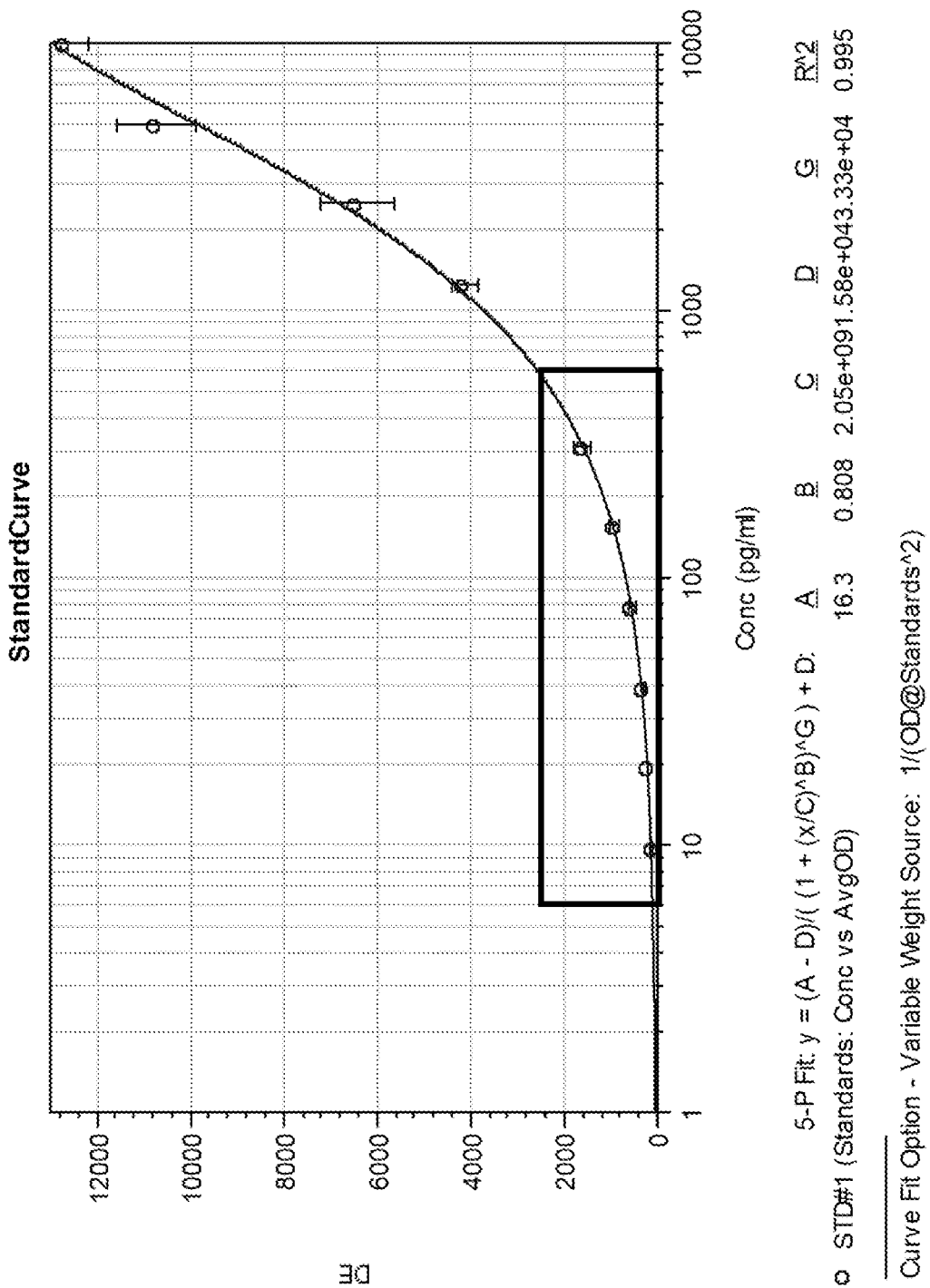
FIG. 1A is a diagram depicting detection of recombinant UBE3A using the Singulex assay.

The present disclosure provides methods of detecting via mass spectrometry the presence or amount of a UBE3A protein in a sample. The methods described herein can be used to detect UBE3A protein in a sample that contains, e.g., less than about 1000 pg/mL (e.g., less than about 900, 800, 700, 600, 500, 400, 300, 100, 50, 20, 15, 10, 5, 1 or 0.5 pg/mL) of the UBE3A protein. The sample can be a human sample (e.g., a human CSF sample, such as a human CSF sample obtained from a human subject having or at risk for developing Angelman syndrome). In some embodiments of the methods described herein, identifying the sample as having an undetectable level of the UBE3A protein, or a level of the UBE3A protein reduced as compared to healthy subjects identifies a subject from whom that sample was obtained as having or at risk for developing Angelman syndrome. The methods provided herein are also useful for monitoring Angelman syndrome disease progression or the effectiveness of treatments for Angelman syndrome.

UBE3A

Ubiquitin Protein Ligase BA (UBE3A) is an E3 ubiquitin ligase that targets proteins for proteasomal degradation by conjugating ubiquitin to the target proteins. UBE3A is also known as E6AP ubiquitin-protein ligase (E6AP), ANCR, AS, EPVE6AP, HPVE6A, HECT-type ubiquitin transferase E3A, human papillomavirus E6-associated protein, and oncogenic protein-associated protein E6-AP. UBE3A protein is encoded by the UBE3A gene which in human resides within the 15q11.2-q13.3 locus that is parentally imprinted in neurons (only the maternal copy is normally active). Mutations in UBE3A can result in certain neurodevelopmental disorders. For example, Prader-Willi syndrome can result from 15q11.2-q13.3 paternal allele deletion, whereas Angelman syndrome can be caused by deletion of the maternal allele. 15q11.2-q13.3 duplication (Dup15q) syndrome, a genetic cause of autism spectrum disorder, can arise from duplications of the maternal allele.

Mutations or deletions in the UBE3A gene can result in the absence of the protein in many areas of the brain.

The amino acid sequence of the human UBE3A protein is shown below.

```
                                             (SEQ ID NO: 1)
MEKLHQCYWKSGEPQSDDIEASRMKRAAAKHLIERYYHQLTEGCGNEACT

NEFCASCPTFLRMDNNAAAIKALELYKINAKLCDPHPSKKGASSAYLENS

KGAPNNSCSEIKMNKKGARIDFKDVTYLTEEKVYEILELCREREDYSPLI

RVIGRVFSSAEALVQSFRKVKQHTKEELKSLQAKDEDKDEDEKEKAACSA

AAMEEDSEASSSRIGDSSQGDNNLQKLGPDDVSVDIDAIRRVYTRLLSNE
```

-continued
```
KIETAFLNALVYLSPNVECDLTYHNVYSRDPNYLNLFIIVMENRNLHSPE

YLEMALPLFCKAMSKLPLAAQGKLIRLWSKYNADQIRRMMETFQQLITYK

VISNEFNSRNLVNDDDAIVAASKCLKMVYYANVVGGEVDTNHNEEDDEEP

IPESSELTLQELLGEERRNKKGPRVDPLETELGVKTLDCRKPLIPFEEFI

NEPLNEVLEMDKDYTFFKVETENKFSFMTCPFILNAVTKNLGLYYDNRIR

MYSERRITVLYSLVQGQQLNPYLRLKVRRDHIIDDALVRLEMIAMENPAD

LKKQLYVEFEGEQGVDEGGVSKEFFQLVVEEIFNPDIGMFTYDESTKLFW

FNPSSFETEGQFTLIGIVLGLAIYNNCILDVHFPMVVYRKLMGKKGTFRD

LGDSHPVLYQSLKDLLEYEGNVEDDMMITFQISQTDLFGNPMMYDLKENG

DKIPITNENRKEFVNLYSDYILNKSVEKQFKAFRRGFHMVTNESPLKYLF

RPEEIELLICGSRNLDFQALEETTEYDGGYTRDSVLIREFWEIVHSFTDE

QKRLFLQFTTGTDRAPVGGLGKLKMIIAKNGPDTERLPTSHTCFNVLLLP

EYSSKEKLKERLLKAITYAKGFGML
```

Angelman syndrome is a neurodevelopmental disorder characterized by intellectual disability, developmental delay, speech impairment, seizures, ataxia, unusually happy demeanor, and motor deficits, among other symptoms. Angelman syndrome patients commonly carry mutations that render the maternally inherited UBE3A gene non-functional. Human genetic studies revealed that Angelman syndrome is associated with de novo maternal deletions of chromosome 15q11-q13, paternal chromosome 15 uniparental disomy, or rare imprinting defects that affect the transcription of genes within 15q11-q13 (Clayton-Smith and Laan, J Med Genet 2003; 40:87-95). More recent studies indicate that a failure to inherit a normal maternal copy of the UBE3A gene accounts for 85-90% of all Angelman Syndrome cases. In this regard, specific loss-of-function mutations in the human UBE3A locus have been identified in a subset of affected individuals (Kishino et al., Nature Genetics 15: 70-73, 1997; Matsuura et al., Nature Genetics 15: 74-77, 1997). Phenotype severity is correlated with the type of mutation, with the full deletion of 151q1-13 the most severe and point mutations in UBE3A less severe (Gentile et al., J Dev Behav Pediatr. 31(7): 592-601, 2010; Valente et al., Epilepsy Research 105: 234-239, 2013).

Methods of Detection

The present disclosure provides methods of detecting a UBE3A protein in a sample, the methods include obtaining a digested peptide preparation from a purified protein preparation, and subjecting the peptide preparation to mass spectrometry to determine the presence or amount of one or more UBE3A peptides. A purified protein preparation can be obtained by contacting the sample with an antibody that binds to the UBE3A protein and removing from the sample some or all of the proteins that are not bound to the antibody.

Usage of the term "antibody" in this disclosure is meant to cover a whole so antibody, a bispecific antibody, a tetravalent antibody, a multispecific antibody, a minibody, a nanobody, and antibody fragments. In some embodiments, the antibody that binds to UBE3A is a whole antibody. UBE3A antibodies including but not limited to those described herein are useful for generating a purified protein preparation. The antibody can be monoclonal or polyclonal. Commercially available polyclonal anti-UBE3A antibodies include, but are not limited to, those from GeneTex (GTX101092), Abcam (ab10488, ab3519, ab235984, ab183869), Proteintech (10344-1-AP), Invitrogen (PA3-843, PA5-12038), and Millipore Sigma (HPA039410, HPA040380, SAB2102627). Commercially available monoclonal anti-UBE3A antibodies include clone 3E5 (e.g. SAB1404508 (Millipore Sigma), H00007337-M02 (Abnova)); clone EX-8 (e.g. ab195649 (abcam)); clone ERP7330 (e.g. ab126765 (abcam), ab240033 (abcam), MABC761 (Millipore Sigma)); clone 10H7.1 (e.g. MABS1683 (Millipore Sigma)); clone D10D3 (e.g. #7526 (Cell Signaling Technology)); clone 2F6 (e.g. WH0007337M1 (Millipore Sigma)); and clone 19H14L13 (703785 (Invitrogen)).

The anti-UBE3A antibody 3E5 binds to the following UBE3A sub-sequence:

```
                                            (SEQ ID NO: 2)
ETFQQLITYKVISNEFNSRNLVNDDDAIVAASKCLKMVYYANVVGGEVDT

NHNEEDDEEPIPESSELTLQELLGEERRNKKGPRVDPLETELGVKTLDC

R.
```

In some embodiments, the antibody that binds to the UBE3A protein binds to the same epitope as 3E5. In some embodiments, the antibody that binds to the UBE3A protein binds to an epitope within SEQ ID NO:2. In some embodiments, the antibody binds to a different epitope from 3E5. Methods of determining whether a particular antibody binds to the same epitope as a reference antibody are known in the art. A particularly useful method is competitive binding, wherein the ability of the antibody of interest to bind to the UBE3A protein in the presence of the reference antibody is measured. Substantial inability of both antibodies to bind simultaneously indicates that substantially the same epitope is involved. In some embodiments, the antibody competes with the 3E5 antibody for binding to UBE3A. Methods of producing antibodies that bind to a specific antigen or a specific epitope of an antigen is known in the art.

The antibody can be in the form of free antibody in a solution and contacting the sample with the antibody includes mixing the antibody solution with the sample. The antibody can also be conjugated to beads, which are used to contact the sample. Beads suitable for antibody conjugation include, e.g., magnetic beads and agarose-based beads. For example, Protein A/G agarose or magnetic beads, or protein A/G sepharose beads can be used. The antibodies described herein can be bound directly to the beads, or indirectly to a pre-coated ligand on the beads. Methods of conjugating antibodies to beads are known and include, for example, use of dimethyl pimelimidate for crosslinking antibodies to beads. Commercially available kits can also be used, such as those provided by Invitrogen (Dynabeads' Antibody Coupling Kit). In some embodiments, the beads (e.g. magnetic beads) are coated with streptavidin, and a biotinylated UBE3A antibody (e.g., clone 3E5) can be coupled to the beads via streptavidin/biotin interaction.

The sample containing UBE3A protein can be contacted with the UBE3A antibody for an amount of time sufficient to allow for binding between the UBE3A protein and the antibody. For example, the sample containing UBE3A protein can be incubated (e.g., at or below room temperature) with UBE3A antibody conjugated beads for an amount of time sufficient to allow binding of the UBE3A protein to the antibody conjugated beads. The ratio by volume between the antibody-conjugated beads and the sample containing UBE3A protein can between about 1:30 to about 1:80 (e.g. 1:30 to about 1:70, about 1:40 to about 1:60, or about 1:50).

Some or all proteins in the sample that are not bound to the antibody can be removed, thereby resulting in a purified UBE3A protein preparation. Removal of unbound proteins can be accomplished by washing the antibody conjugated beads one or more times with a buffer. Any suitable buffer that preferably does not affect the binding between UBE3A protein and the antibody can be used.

Digestion

The methods described herein further include subjecting the purified protein preparation to enzymatic digestion, resulting in a digested peptide preparation that contains one or more UBE3A peptides. UBE3A peptides as used herein refers to fragments of the UBE3A protein having a length within the range of, e.g., about 3 to about 100 amino acids. The digestion reaction can be carried out at a suitable temperature (e.g., below, at, or above room temperature) for an amount of time sufficient to generate, for example, one or more UBE3A peptides listed in Table 17. Proteases such as but not limited to trypsin, chymotrypsin, carboxypeptidase, serine proteases, proteinase K, papain, and pepsin can be used for digesting the UBE3A protein. In some embodiments, a trypsin-based digestion solution that contains either free trypsin or immobilized trypsin can be used. In some embodiments, trypsin that is modified to inactivate extraneous chymotryptic activity (e.g. TPCK-treated trypsin) is used.

The digested peptide preparation can contain one or more peptides listed in Table 17. In some embodiments, the digested peptide preparation contains a peptide that is at least 90% (e.g., at least 91%, 92%, 93%, 94%, 95%, 96%, 97%, 98%, or 99%) identical to one of the peptides listed in Table 17. In some embodiments, the digested peptide preparation contains a peptide that is different from one of the peptides listed in Table 17 by one, two or three amino acids. In some embodiments, the digested peptide preparation contains one or more (e.g., 2, 3, or all 4) peptides selected from the group consisting of: VFSSAEALVQSFR (SEQ ID NO:3), NLVNDDDAIVAASK (SEQ ID NO:4), VDPLETELGVK (SEQ ID NO:5), and LEMIAMENPADLKK (SEQ ID NO:6). In some embodiments, the digested peptide preparation contains a peptide that is at least 90% (e.g., at least 91%, 92%, 93%, 94%, 95%, 96%, 97%, 98%, or 99%) identical to one of the peptides selected from the group consisting of SEQ ID NOs 3-6. In some embodiments, the digested peptide preparation contains a peptide that is different by addition or deletion of one, two or three amino acids from one of the peptides selected from the group consisting of SEQ ID NOs 3-6.

Mass Spectrometry

The methods described herein further include determining via mass spectrometry the presence or amount of one or more UBE3A peptides in the digested peptide preparation, thereby identifying the presence or amount of the UBE3A protein in the sample. Any suitable mass spectrometry systems described herein or known in the art can be used. For example, Matrix Assisted Laser Desorption/Ionization-Time of Flight (MALDI-TOF), Triple Quadrupole Mass Spectrometry, Quadrupole-Trap Mass Spectrometry, Hybrid Linear Ion Trap Orbitrap Mass Spectrometry, and Quadrupole-Orbitrap Mass Spectrometry. In some embodiments, coupled chromatography-mass spectrometry systems are used, such as Liquid chromatography-mass spectrometry (LC-MS). Liquid chromatography, for example, can separate the multiple UBE3A peptides in the digested peptide preparation, which are then subjected to mass spectrometry to measure the mass-to-charge ratio of charged particles, useful for analyzing e.g. the mass of the peptides, their elemental and isotopic composition. Methods of determining the identity or amount of peptides in a sample based on mass spectrometry signal and intensity are known in the art. Mass analyzers useful in LC-MS systems include, e.g. the quadrupole, time-of-flight (TOF), ion traps, and hybrid quadrupole-TOF (QTOF) analyzers.

Some embodiments of the present disclosure provide detection of the presence or amount of one or more peptides in Table 17 via mass spectrometry. Detection of additional peptides not listed in Table 17, e.g., additional UBE3A peptides are also contemplated herein. In some embodiments, the methods include detection of the presence or amount of at least one peptide (e.g., 2, 3, or all 4 peptides) selected from the group consisting of SEQ ID NOs 3-6.

Sample

Samples that contain UBE3A protein for use in the methods described herein include any of various types of biological samples that can be isolated and/or derived from a subject (e.g., a human subject). The sample can be isolated and/or derived from any fluid, cell or tissue. In some embodiments, the sample is blood serum, blood plasma, whole blood, lymph, saliva, urine, cerebrospinal fluid (CSF), cell lysates, vitreous fluid, or ocular fluid. Samples containing recombinant UBE3A proteins are also contemplated herein. In some embodiments, the present disclosure provides methods of detecting the presence or amount of a UBE3A protein in a CSF sample (e.g., a human CSF sample).

A sample of CSF can be obtained from an individual according to known methods. For example, CSF can be collected from an individual through lumbar puncture, with or without accompanying x-ray or CT scans, as well as cisternal puncture and ventricular puncture. CSF can also be collected from a tube that has been placed in the fluid, such as a shunt or a ventricular drain. In some embodiments, the sample is obtained from a subject that is diagnosed as having Angelman syndrome or is suspected of having Angelman syndrome.

The sample of the present disclosure can optionally contain about 1000 pg/mL or less (e.g., about 900, 800, 700, 600, 500, 400, 300, 200, 100, 50, 20, 10, 1, 0.5 pg/mL or less) of the UBE3A protein. In some embodiments, the sample contains about 0.1 to about 1000 pg/mL (e.g., about 0.1 to about 800, about 0.1 to about 600, about 0.1 to about 400, about 0.1 to about 300, about 0.1 to about 200, about 0.1 to about 100, about 0.1 to about 50, about 0.1 to about 20, about 0.1 to about 10, about 0.5 to about 1000, about 0.5 to about 800, about 0.5 to about 600, about 0.5 to about 400, about 0.5 to about 300, about 0.5 to about 200, about 0.5 to about 100, about 0.5 to about 50, about 0.5 to about 20, about 0.5 to about 10, about 10 to about 1000, about 10 to about 800, about 10 to about 600, about 10 to about 400, about 10 to about 300, about 10 to about 200, about 10 to about 100, about 10 to about 50, about 10 to about 20, about 20 to about 1000, about 20 to about 800, about 20 to about 600, about 20 to about 400, about 20 to about 300, about 20 to about 200, about 20 to about 100, about 20 to about 50, about 50 to about 1000, about 50 to about 800, about 50 to about 600, about 50 to about 400, about 50 to about 300, about 50 to about 200, about 50 to about 100, about 100 to about 1000, about 100 to about 800, about 100 to about 600, about 100 to about 400, about 100 to about 300, about 100 to about 200, about 200 to about 1000, about 200 to about 800, about 200 to about 600, about 200 to about 400, about 200 to about 300, about 300 to about 1000, about 300 to about 800, about 300 to about 600, about 300 to about 400, about 400 to about 1000, about 400 to about 800, about 400 to about 600, about 600 to about 1000, about 600 to about 800, about 800 to about 1000 pg/mL) of the UBE3A protein.

The methods of detection described herein are capable of detecting with high sensitivity the presence or amount of low levels of UBE3A protein in a sample. In some embodiments, the methods of detection described herein detect the presence or amount of UBE3A protein in samples that contain 20 pg/mL or less (e.g., 15, 10, 5, 1, 0.5 pg/mL or less) of UBE3A protein.

A sample that is to be subjected to analysis can optionally be spiked with an internal standard, prior to immunoprecipitation and digestion, to normalize for run to run variation and any anomalies in immunoprecipitation and digestion. For example, a known amount of a heavy UBE3A protein (e.g., an N15-labeled UBE3A protein) can be added to a sample (e.g., a CSF sample) before the sample is processed (i.e., before immunoprecipitation and digestion).

In addition, a sample that is to be subjected to analysis can optionally be spiked with an internal standard, after immunoprecipitation and digestion but prior to mass spectrometry, to normalize for run to run variation and any anomalies in mass spectrometry. For example, a known amount of one or more heavy synthesized UBE3A peptides (e.g., one or more UBE3A peptides labeled with a C13/N15-C-terminal lysine, such as labeled NLVNDDDAIVAASK (SEQ ID NO:4) and/or labeled VDPLETELGVK (SEQ ID NO:5)) can be added to a sample preparation after immunoprecipitation and digestion but prior to LC/MS analysis.

In some embodiments, both of the foregoing internal controls (i.e., a first internal standard added prior to immunoprecipitation and digestion combined with a second internal standard added prior to mass spectrometry) are used to maximize reliability of the assay results.

Methods of Diagnosis, Treatment, and Treatment Monitoring

This disclosure provides methods for determining whether a human subject has or is at risk for developing Angelman syndrome. Also provided are methods for monitoring disease progression in a subject diagnosed with Angelman syndrome, or monitoring an Angelman syndrome patient's response to a treatment. The methods rely on detection of the presence or amount of a UBE3A protein in one or more samples (e.g., any suitable sample described herein) obtained from the subject. In some embodiments, the subject has been identified as having Angelman syndrome or at risk for developing Angelman syndrome based on other diagnostic methods (including but not limited to those described herein). In some embodiments, the subject is undergoing treatment for Angelman syndrome. For example, the UBE3A protein level in the subject undergoing treatment for Angelman syndrome can be monitored by taking one or more samples at two or more different time points during treatment.

The methods include obtaining or having obtained a sample and determining the presence or level of UBE3A in the sample using methods described herein. In some embodiments, the methods include comparing the presence or amount of UBE3A protein in the sample with one or more references, e.g., a control reference that represents a normal level of UBE3A (such as a level in an unaffected subject), or a disease reference that represents a level of the UBE3A protein associated with Angelman syndrome (such as a level in a subject having or at risk for developing Angelman syndrome).

The subject from whom the sample was obtained can be identified as having or at risk of developing Angelman syndrome if the level of UBE3A protein in the sample is undetectable (e.g. using the methods of detection described herein), or if the level of the UBE3A protein is reduced as compared to a control reference that represents a normal level of UBE3A (such as a level in an unaffected subject). The subject can also be identified as having or at risk for developing Angelman syndrome if the level of UBE3A protein in the sample is within the range found in subjects with Angelman syndrome.

Suitable reference values can be determined using methods known in the art. The reference values can have any relevant form. In some cases, the reference comprises a predetermined value for a meaningful level of UBE3A protein in a sample, e.g., a control reference level that represents a normal level of UBE3A protein, e.g., a level in an unaffected subject or a subject who is not at risk of developing Angelman syndrome, and/or a disease reference that represents a level of UBE3A associated with Angelman syndrome, e.g., a level in a subject having Angelman syndrome.

In some embodiments, the level of UBE3A in a subject is comparable to the level of UBE3A in the disease reference, and the subject has one or more symptoms (e.g., any of the behavioral symptoms or physical appearances described herein) associated with Angelman syndrome, then the subject has Angelman syndrome. In some embodiments, the subject has no overt signs or symptoms of Angelman syndrome, but the level of UBE3A is comparable to the level in the disease reference, then the subject has an increased risk of developing Angelman syndrome.

The predetermined level can be a single cut-off (threshold) value, such as a median or mean, or a level that defines the boundaries of an upper or lower quartile, tertile, or other segment of a clinical trial population that is determined to be statistically different from the other segments. It can be a range of cut-off (or threshold) values, such as a confidence interval. It can be established based upon comparative groups, such as where association with risk of developing Angelman syndrome or presence of Angelman syndrome in one defined group is a fold higher, or lower, (e.g., approximately 2-fold, 4-fold, 8-fold, 16-fold or more) than the risk or presence of Angelman syndrome in another defined group. It can be a range, for example, where a population of subjects (e.g., control subjects) is divided equally (or unequally) into groups, such as a low-risk group, a medium-risk group and a high-risk group, or into quartiles, the lowest quartile being subjects with the lowest risk and the highest quartile being subjects with the highest risk, or into n-quantiles (i.e., n regularly spaced intervals) the lowest of the n-quantiles being subjects with the lowest risk and the highest of the n-quantiles being subjects with the highest risk. In some embodiments, the predetermined level is a level or occurrence in the same subject, e.g., at a different time point, e.g., an earlier time point.

Subjects associated with predetermined values are typically referred to as reference subjects. For example, in some embodiments, a control reference subject does not have Angelman syndrome. A disease reference subject is one who has (or has an increased risk of developing) Angelman syndrome. An increased risk is defined as a risk above the risk of subjects in the general population.

Thus, in some cases the level of UBE3A in a subject being less than or equal to a reference level of UBE3A is indicative of Angelman syndrome. In other cases the level of UBE3A in a subject being greater than or equal to the reference level of UBE3A is indicative of the absence of Angelman syndrome or having low risk of developing Angelman syndrome. In cases where the level of UBE3A in a subject being equal to the reference level of UBE3A, the "being equal" refers to being approximately equal (e.g., not statistically different).

The predetermined value can depend upon the particular population of subjects selected. For example, an apparently healthy population will have a different 'normal' range of levels of UBE3A than will a population of subjects which have, are likely to have, or are at greater risk to have, Angelman syndrome. Accordingly, the predetermined values selected may take into account the category (e.g., sex, age, health, risk, presence of other diseases) in which a human subject falls. Appropriate ranges and categories can be selected with no more than routine experimentation by those of ordinary skill in the art. In characterizing likelihood, or risk, numerous predetermined values can be established.

Additional methods of diagnosing a subject as having Angelman syndrome, or at risk for developing Angelman syndrome include genetic tests and behavioral symptom or physical appearance based diagnosis. For example, genetic tests such as chromosome analysis (e.g., fluorescent in situ hybridization (FISH) based chromosome analysis), DNA methylation test, and sequencing of the UBE3A gene are useful diagnostic tools. Behavioral symptoms or physical appearances for diagnosing Angelman syndrome include, but are not limited to, hand flapping or walking with arms in the air; jerky body movements; stiffed-leg walk; little or no speech; attention deficits; hyperactivity; feeding problems, e.g., in infancy; sleep problems and a need for less sleep than peers; delays in motor development; frequent laughter that may occur at inappropriate times; excitable personality; tongue thrusting; strabismus (crossing of the eyes); small head size with flatness in the back of the head; a lower jaw that juts out; light pigmentation in the hair skin and eyes. The methods of detecting presence or level of a UBE3A protein in a subject's sample can be used in combination with one or more of the diagnostic criteria described above for diagnosing a subject as having or at risk for developing Angelman syndrome.

Once it has been determined that a person has Angelman syndrome or has an increased risk of developing Angelman syndrome, then a treatment can be administered. Treatments for Angelman syndrome can include those that treat one or more symptoms related to Angelman syndrome. Suitable therapies include those for preventing or treating seizures (e.g. anticonvulsant medication); physical therapy (e.g. for maintaining or improving joint mobility and movement); speech therapy; occupational or behavioral therapy. Other treatments include those that increase neuronal UBE3A protein expression. For example, a treatment can be a gene therapy to increase activity of UBE3A protein, e.g., by increasing levels of functional UBE3A protein and/or increasing copies of a UBE3A gene that expresses functional protein. In other examples, a treatment can be a nucleic acid molecule, e.g., an oligonucleotide, e.g., an antisense oligonucleotide, that reduces the level of UBE3A antisense transcript (UBE3A-ATS), thereby increasing UBE3A protein production. The presence or level of UBE3A protein in a patient can be monitored during treatment by obtaining one or more samples (e.g., a CSF sample) from the patient at various time points and subject the samples to the methods of detection provided herein.

In some embodiments, a subject diagnosed as having or at risk for developing Angelman syndrome (e.g., using any of the methods disclosed herein, alone or in combination) is administered a treatment for Angelman syndrome (e.g., any of the therapeutic treatments described herein, e.g., gene therapy or an antisense oligonucleotide). The level of UBE3A protein in one or more samples obtained from the subject at one or more time points after initiation of treatment can be determined using the methods described herein. In some embodiments, a higher UBE3A protein level after initiation of treatment compared to a control value (e.g., the range of UBE3A protein level found in subjects with Angelman syndrome) indicates that the therapeutic treatment is efficacious. In some embodiments, a higher UBE3A protein level after initiation of treatment compared to the UBE3A protein level in the subject prior to the initiation of treatment indicates that the therapeutic treatment is efficacious. In some embodiments, the treatment is deemed efficacious if progression of the disease is reduced or halted. In some embodiments, a higher UBE3A protein level compared to a control value (or the UBE3A protein level measured in the subject prior to the initiation of treatment) indicates that the therapeutic treatment can be continued at the same or lower dosage and/or at the same or lengthened dosing interval. In some embodiments, a UBE3A protein level equal to or lower than a control value (or the UBE3A protein level measured in the subject prior to the initiation of treatment) indicates that the therapeutic treatment can be continued at a higher dosage and/or at a shortened dosing interval. Therapeutic treatments can continue until the UBE3A protein level in a subject is comparable to or higher than that of a control value (or higher than that of the UBE3A protein level measured in the subject prior to the initiation of treatment). In some embodiments, once the UBE3A protein level in a subject is comparable to or higher than that of a control value (or higher than that of the UBE3A protein level measured in the subject prior to the initiation of treatment), maintenance doses of the therapeutic treatment can be administered thereafter. A "maintenance dose" refers to a constant dose level at which the therapeutic treatment is administered to the subject indefinitely, e.g., after the treatment is found to be efficacious in the subject.

This disclosure also provides methods for determining whether a human subject is a candidate for a UBE3A targeted therapeutic. In one embodiment, the method entails identifying a subject as a candidate for a UBE3A targeted therapeutic by measuring according to a method described herein a UBE3A protein level in a biological sample obtained from the human subject.

This disclosure also provides methods for identifying a human subject as having a lower or higher level of UBE3A protein than a reference level. In one embodiment, the method entails identifying a human subject as having a lower or higher level of UBE3A protein than a reference level by measuring according to a method described herein a UBE3A protein level in a biological sample obtained from the human subject and comparing the measured UBE3A protein level to a reference level.

This disclosure also provides methods for identifying a human subject as having or being at risk of developing a disease in which UBE3A protein levels are elevated compared to a reference. In one embodiment, the method entails identifying a human subject as having or being at risk of developing a disease in which UBE3A protein levels are elevated compared to a reference by measuring according to a method described herein a UBE3A protein level in a biological sample obtained from the human subject and comparing the measured UBE3A protein level to a reference, wherein the measured UBE3A protein level is elevated compared to the reference.

This disclosure also provides methods for identifying a human subject as having or being at risk of developing a disease in which UBE3A protein levels are lower compared to a reference. In one embodiment, the method entails identifying a human subject as having or being at risk of developing a disease in which UBE3A protein levels are lower compared to a reference by measuring according to a method described herein a UBE3A protein level in a biological sample obtained from the human subject and comparing the measured UBE3A protein level to a reference, wherein the measured UBE3A protein level is lower compared to the reference.

In some methods described herein, e.g., where a subject is identified as having an elevated UBE3A protein level, a UBE3A targeted therapeutic is intended to reduce UBE3A protein levels or decrease UBE3A activity. Examples of such therapeutics include an inhibitor of UBE3A protein, an inhibitor of UBE3A expression, transcription, or translation, or an inhibitor of a molecule in the same pathway as UBE3A. The therapeutic can be, for example, a nucleic acid (e.g., an antisense oligonucleotide that reduces the level of a UBE3A transcript, thereby decreasing UBE3A protein production), a small molecule (e.g., a small molecule inhibitor of UBE3A activity), or an anti-UBE3A antibody (e.g., an antibody that binds to UBE3A and decreases activity of the protein).

EXAMPLES

The following examples are provided to better illustrate the claimed invention and are not to be interpreted as limiting the scope of the invention. To the extent that specific materials are mentioned, it is merely for purposes of illustration and is not intended to limit the invention. One skilled in the art can develop equivalent means or reactants without the exercise of inventive capacity and without departing from the scope of the invention.

Example 1: Immunoassays for UBE3A Detection

An immunoassay for UBE3A detection based on the Singulex Errena system was developed. An exemplary protocol for the Singulex Errena system based assay is described in Fischer et al. AAPS J 17(1):93-101, 2015. UBE3A standard protein (Abcam, ab125736) was used. The anti-UBE3A antibody GTX10488 (GeneTex) was used as the capture antibody, and the anti-UBE3A antibody H00007337-M02 (AbNova) was used as the detection antibody. Paramagnetic microparticles (MPs) were used as the solid phase for immune-capture and detection of the UBE3A standard protein in a microplate format. Signal generated by fluorescently labeled detection antibodies were counted as digital events, which corresponds to a single UBE3A molecule. On average an MP was coated with 12.5 µg of the capture antibody, and the MPs were used at 10 µg per well. The detection antibody was used at 500 ng/mL.

Results from the assay showed high levels of background, as shown by the values in the "DE" column in Table 1 below. DE refers to all Digital Events recorded, which is used to calculate the Event Photons (EP). For reference, a typical background for this assay is between 50-100 DE.

TABLE 1

| | DE | | | EP | | | Interpolated [UBE3A] pg/mL | | | | DE | |
|---|---|---|---|---|---|---|---|---|---|---|---|---|
| N | Mean | SD | % CV | Mean | SD | % CV | Mean | SD | % CV | % Recovery | S/N | S-N |
| 2 | 13619 | 226 | 1.7 | 5689633 | 494838 | 8.7 | 2039.33 | 217.54 | 10.67 | 102 | 33.1 | 12961 |
| 3 | 9335 | 445 | 4.8 | 2269634 | 154973 | 6.8 | 661.46 | 53.84 | 8.14 | 95 | 22.7 | 8459 |
| 2 | 4907 | 183 | 3.7 | 926475 | 32982 | 3.6 | 256.41 | 10.16 | 3.96 | 107 | 11.9 | 4292 |
| 3 | 1769 | 164 | 9.3 | 290824 | 33071 | 11.4 | 78.6 | 9.02 | 11.47 | 94 | 4.3 | 1173 |
| 2 | 925 | 24 | 2.6 | 143334 | 8050 | 5.6 | 31.06 | 1.51 | 4.87 | 108 | 2.3 | 470 |
| 3 | 585 | 17 | 2.9 | 91306 | 3701 | 4.1 | 10.59 | 1.02 | 9.68 | 106 | 1.4 | 136 |
| 2 | 461 | 16 | 3.5 | 71838 | 4251 | 5.9 | 3.39 | 0.9 | 26.67 | 98 | 1.1 | 13 |
| 2 | 397 | 4 | 1.1 | 63527 | 2266 | 3.6 | ND | — | — | — | 1 | −39 |
| 2 | 391 | 4 | 0.9 | 62955 | 1030 | 1.6 | ND | — | — | — | 1 | −44 |
| 3 | 398 | 19 | 4.8 | 64101 | 4319 | 6.7 | ND | — | — | — | 1 | −53 |
| 3 | 420 | 43 | 10.3 | 69799 | 9001 | 12.9 | ND | — | — | — | 1 | −55 |
| 3 | 411 | 20 | 5 | 70828 | 6771 | 9.6 | ND | — | — | — | — | — |
| Bkgrd | 411 | | | | | | | | | | | |
| SD | 20.42 | | | | | | | | | | | |
| Slope (DE/pg/mL) | 18.29 | | | | | | | | | | | |
| LoD (pg/mL) | 20.23 | | | | | | | | | | | |
| LLoQ (pg/mL) | 10.01 | | | | | | | | | | | |

Figure 1B:
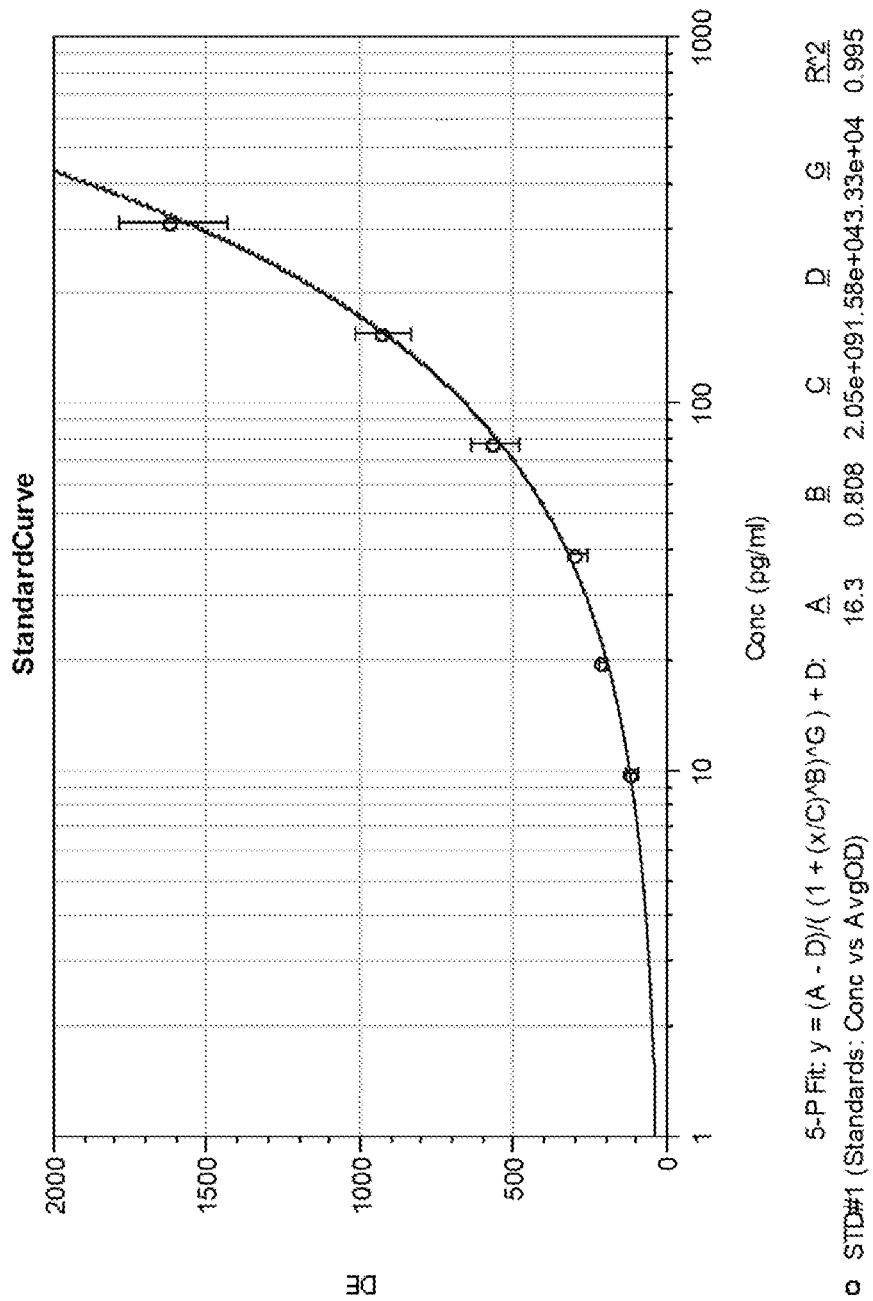
FIG. 1B is an enlarged graph of the area marked in FIG. 1A.

A further Singulex experiment was carried out using a different capture antibody, GTX101092 (GeneTex) and a different UBE3A standard protein (ab206157, Abcam). The same detection antibody, H00007337-M02 (AbNova) was used. On average an MP was coated with 25 μg of the capture antibody, and the MPs were used at 25 μg per well. The detection antibody was used at 125 ng/mL. FIG. 1A shows a standard curve plotted based on the concentration of UBE3A and the DE values. FIG. 1B is an enlarged graph of the area marked in FIG. 1A. The standard curve was generated based on quadruplets. Table 2 shows the concentration of recombinant UBE3A protein that was loaded into the assay and respective recovery rate which was suitable over much of the observed range. Average DE ("AvgDE") represents the raw signal from the assay. 21 CSF samples tested using this setup had a signal to noise ratio of less than 2, at both neat and 1:2 dilutions. UBE3A was detected in one brain tissue sample tested using this assay setup, however the signal to noise ratio was low, at about 2.5. Additional capture antibodies were also evaluated, however, none improved the performance of the assay.

TABLE 2

| Concentration (pg/ml) | AvgDE | % Recovery | CV |
|---|---|---|---|
| 10000 | 12692.5 | 95.2 | 4.1 |
| 5000 | 10727.33 | 122.4 | 7.8 |
| 2500 | 6434 | 93.1 | 12.3 |
| 1250 | 4129.5 | 94.1 | 6.5 |
| 625 | Masked | Masked | Masked |
| 312.5 | 1611.25 | 103.8 | 10.9 |
| 156.25 | 922.333 | 100.0 | 9.9 |
| 78.125 | 559.25 | 104.8 | 14.2 |
| 39.063 | 289.25 | 88.4 | 11.3 |
| 19.531 | 207.5 | 113.3 | 6.3 |

TABLE 2-continued

| Concentration (pg/ml) | AvgDE | % Recovery | CV |
|---|---|---|---|
| 9.766 | 112 | 96.3 | 18.6 |
| 0 | 62.75 | | |

Next, a Quanterix Simoa assay system was used for UBE3A detection. Exemplary protocols for the Quanterix Simoa system based assay are described in e.g., Fischer et al. AAPS J 17(1):93-101, 2015 and Wilson et al. Journal of Laboratory Automation, 21(4):533-547, 2016. The two-step Quanterix format was first evaluated to identify the optimal bead antibody and detector antibody combination. The assay condition used is shown in Table 3. Three antibodies, including GTX101092 (GeneTex, referred to as "GTX" herein after), 2F6 (WH0007337M1-100 ug, Millipore-Sigma) and NB500-240 (Novus, referred to as "Novus" herein after), were tested in pairs. The sensitivity of antibody combinations were assessed using a dilution curve of a recombinant UBE3A protein. Table 4 shows results of the assessment (MS detector: Millipore-Sigma 2F6). AEB stands for the Average Enzymes per Bead and is the raw signal readout from the Quanterix Simoa assay system. The combination of GTX as the capture antibody, and Novus as the detection antibody lead to better sensitivity throughout the curve.

TABLE 3

| 2-step Assay conditions: | Concentration | Volume | Incubation Period (minutes): |
|---|---|---|---|
| Beads: | 4e6 beads/well | 25 ul/well | 35:15 |
| Detector: | 0.6 ug/ml | 20 ul/well | |
| SBG: | 150 pm | 100 ul/well | 5:15 |

TABLE 4

| Capture/Detector Combination | UBE3A Concentration (ng/ml) | AEB1 | AEB2 | Ave AEB | AEB CV | Signal to Background |
|---|---|---|---|---|---|---|
| GTX bead, GTX detector | 0 | 0.0559 | 0.0451 | 0.0505 | 15% | — |
| | 0.01 | 0.0483 | 0.0494 | 0.0489 | 2% | 0.97 |
| | 0.1 | 0.0525 | 0.0487 | 0.0506 | 5% | 1.00 |
| | 1 | 0.0504 | 0.0530 | 0.0517 | 4% | 1.02 |
| | 10 | 0.0957 | 0.0942 | 0.0950 | 1% | 1.88 |
| GTX bead, Novus detector | 0 | 0.0082 | 0.0066 | 0.0074 | 15% | |
| | 0.01 | 0.0082 | 0.0072 | 0.0077 | 9% | 1.04 |
| | 0.1 | 0.0089 | 0.0108 | 0.0098 | 14% | 1.33 |
| | 1 | 0.0247 | 0.0237 | 0.0242 | 3% | 3.26 |
| | 10 | 0.1261 | 0.1297 | 0.1279 | 2% | 17.3 |
| GTX bead, MS detector | 0 | 0.0925 | 0.0918 | 0.0921 | 0% | — |
| | 0.01 | 0.0965 | 0.0944 | 0.0955 | 2% | 1.04 |
| | 0.1 | 0.0906 | 0.0965 | 0.0936 | 4% | 1.02 |
| | 1 | 0.0965 | 0.0950 | 0.0957 | 1% | 1.04 |
| | 10 | 0.1092 | 0.1093 | 0.1092 | 0% | 1.19 |
| Novus bead, GTX detector | 0 | 0.0482 | 0.0519 | 0.0501 | 5% | — |
| | 0.01 | 0.0531 | 0.0522 | 0.0527 | 1% | 1.05 |
| | 0.1 | 0.0516 | 0.0515 | 0.0516 | 0% | 1.03 |
| | 1 | 0.0503 | 0.0488 | 0.0496 | 2% | 0.99 |
| | 10 | 0.0616 | 0.0585 | 0.0601 | 4% | 1.20 |
| Novus bead, Novus detector | 0 | 0.0161 | 0.0172 | 0.0167 | 5% | — |
| | 0.01 | 0.0255 | 0.0175 | 0.0215 | 27% | 1.29 |
| | 0.1 | 0.0167 | 0.0132 | 0.0149 | 16% | 0.90 |
| | 1 | 0.0174 | 0.0179 | 0.0177 | 2% | 1.06 |
| | 10 | 0.0441 | 0.0461 | 0.0451 | 3% | 2.71 |
| Novus bead, MS detector | 0 | 0.0515 | 0.0474 | 0.0494 | 6% | — |
| | 0.01 | 0.0511 | 0.0431 | 0.0471 | 12% | 0.95 |
| | 0.1 | 0.0470 | 0.0451 | 0.0460 | 3% | 0.93 |
| | 1 | 0.0480 | 0.0444 | 0.0462 | 6% | 0.93 |
| | 10 | 0.0475 | 0.0450 | 0.0462 | 4% | 0.92 |
| MS bead, GTX detector | 0 | 0.0698 | 0.0640 | 0.0669 | 6% | — |
| | 0.01 | 0.0481 | 0.0445 | 0.0463 | 6% | 0.69 |
| | 0.1 | 0.0426 | 0.0425 | 0.0426 | 0% | 0.64 |
| | 1 | 0.0418 | 0.0409 | 0.0413 | 2% | 0.62 |
| | 10 | 0.0412 | 0.0418 | 0.0415 | 1% | 0.62 |
| MS bead, Novus detector | 0 | 0.0160 | 0.0168 | 0.0164 | 3% | — |
| | 0.01 | 0.0183 | 0.0162 | 0.0172 | 9% | 1.05 |
| | 0.1 | 0.0164 | 0.0185 | 0.0175 | 8% | 1.06 |
| | 1 | 0.0212 | 0.0206 | 0.0209 | 2% | 1.27 |
| | 10 | 0.0437 | 0.0449 | 0.0443 | 2% | 2.70 |

Further experiments were carried out to evaluate the three-step format of the Quanterix assay and identify an optimal pair of capture antibody and detection antibody. The assay conditions are shown in Table 5. Table 6 shows results of the assessment. Similar to the two-step format, the combination of GTX as the capture antibody, and Novus as the detection antibody was identified as the optimal pair.

TABLE 5

| 3-step Assay conditions: | Concentration | Volume | Incubation Period (minutes): |
|---|---|---|---|
| Beads: | 4e6 beads/well | 25 ul/well | 30:00 |
| Detector: | 0.1 ug/ml | 100 ul/well | 5:15 |
| SBG: | 150 pm | 100 ul/well | 5:15 |

TABLE 6

| Capture/Detector Combination | UBE3A Concentration (ng/ml) | AEB1 | AEB2 | Ave AEB | AEB CV | Signal to Background |
|---|---|---|---|---|---|---|
| GTX bead, GTX detector | 0 | 0.0213 | 0.0214 | 0.0214 | 1% | — |
| | 0.01 | 0.0190 | 0.0210 | 0.0200 | 7% | 0.94 |
| | 0.1 | 0.0192 | 0.0198 | 0.0195 | 2% | 0.91 |
| | 1 | 0.0243 | 0.0204 | 0.0224 | 12% | 1.05 |

TABLE 6-continued

| Capture/Detector Combination | UBE3A Concentration (ng/ml) | AEB1 | AEB2 | Ave AEB | AEB CV | Signal to Background |
|---|---|---|---|---|---|---|
| | 10 | 0.0337 | 0.0340 | 0.0339 | 1% | 1.59 |
| GTX bead, Novus detector | 0 | 0.0068 | 0.0054 | 0.0061 | 16% | — |
| | 0.01 | 0.0064 | 0.0053 | 0.0059 | 13% | 0.96 |
| | 0.1 | 0.0050 | 0.0068 | 0.0059 | 22% | 0.97 |
| | 1 | 0.0097 | 0.0091 | 0.0094 | 5% | 1.54 |
| | 10 | 0.0356 | 0.0426 | 0.0391 | 13% | 6.42 |
| GTX bead, MS detector | 0 | 0.0449 | 0.0436 | 0.0442 | 2% | — |
| | 0.01 | 0.0430 | 0.0459 | 0.0445 | 5% | 1.01 |
| | 0.1 | 0.0432 | 0.0414 | 0.0423 | 3% | 0.96 |
| | 1 | 0.0409 | 0.0476 | 0.0443 | 11% | 1.00 |
| | 10 | 0.0470 | 0.0463 | 0.0466 | 1% | 1.05 |
| Novus bead, GTX detector | 0 | 0.0223 | 0.0227 | 0.0225 | 1% | — |
| | 0.01 | 0.0217 | 0.0245 | 0.0231 | 9% | 1.03 |
| | 0.1 | 0.0223 | 0.0228 | 0.0225 | 2% | 1.00 |
| | 1 | 0.0264 | 0.0248 | 0.0256 | 4% | 1.14 |
| | 10 | 0.0258 | 0.0245 | 0.0252 | 4% | 1.12 |
| Novus bead, Novus detector | 0 | 0.0098 | 0.0112 | 0.0105 | 10% | — |
| | 0.01 | 0.0110 | 0.0112 | 0.0111 | 1% | 1.06 |
| | 0.1 | 0.0140 | 0.0114 | 0.0127 | 14% | 1.21 |
| | 1 | 0.0125 | 0.0145 | 0.0135 | 10% | 1.29 |
| | 10 | 0.0168 | 0.0179 | 0.0173 | 5% | 1.65 |
| Novus bead, MS detector | 0 | 0.0247 | 0.0231 | 0.0239 | 5% | — |
| | 0.01 | 0.0221 | 0.0242 | 0.0232 | 6% | 0.97 |
| | 0.1 | 0.0269 | 0.0251 | 0.0260 | 5% | 1.09 |
| | 1 | 0.0277 | 0.0240 | 0.0259 | 10% | 1.08 |
| | 10 | 0.0249 | NaN | 0.0249 | #DIV/0! | 1.04 |
| MS bead, GTX detector | 0 | 0.0189 | 0.0184 | 0.0187 | 2% | — |
| | 0.01 | 0.0162 | 0.0191 | 0.0176 | 12% | 0.94 |
| | 0.1 | 0.0170 | 0.0184 | 0.0177 | 6% | 0.95 |
| | 1 | 0.0178 | 0.0198 | 0.0188 | 8% | 1.01 |
| | 10 | 0.0251 | 0.0292 | 0.0271 | 11% | 1.45 |
| MS bead, Novus detector | 0 | 0.0098 | 0.0076 | 0.0087 | 17% | — |
| | 0.01 | 0.0086 | 0.0101 | 0.0093 | 12% | 1.07 |
| | 0.1 | 0.0107 | 0.0084 | 0.0095 | 18% | 1.10 |
| | 1 | 0.0095 | 0.0090 | 0.0092 | 4% | 1.06 |
| | 10 | 0.0153 | 0.0116 | 0.0134 | 20% | 1.54 |

Using the optimal pair of antibodies identified above, a comparison between the two-step format and the three-step format was carried out. Based on the results (Table 7), the three-step format has a lower background and better dynamic range, but the two-step format has higher sensitivity, and so the two-step format was selected for further evaluation.

TABLE 7

| Assay Format | Capture/Detector Combination | UBE3A Concentration (ng/ml) | Weight | AEB1 | AEB2 | Ave AEB | AEB CV | Signal to Background | LOD |
|---|---|---|---|---|---|---|---|---|---|
| 2-step | GTX bead, Novus detector | 0 | 1 | 0.0046 | 0.0020 | 0.0033 | 56% | — | 0.116 |
| | | 0.122 | 1.000 | 0.0040 | 0.0037 | 0.0039 | 5% | 1.18 | |
| | | 0.488 | 1.000 | 0.0073 | 0.0069 | 0.0071 | 4% | 2.16 | |
| | | 1.95 | 1.00 | 0.0180 | 0.0187 | 0.0184 | 3% | 5.62 | |
| | | 7.81 | 1.00 | 0.0580 | 0.0481 | 0.0530 | 13% | 16.2 | |
| | | 31.3 | 1.0 | 0.1414 | 0.1258 | 0.1336 | 8% | 40.8 | |
| | | 125 | 1 | 0.2628 | 0.2413 | 0.2520 | 6% | 77.1 | |
| | | 500 | 1 | 0.3030 | 0.3081 | 0.3055 | 1% | 93.4 | |
| 3-step | GTX bead, Novus detector | 0 | 1 | 0.0018 | 0.0025 | 0.0022 | 23% | — | 0.589 |
| | | 0.122 | 1.000 | 0.0021 | 0.0020 | 0.0020 | 1% | 0.624 | |
| | | 0.488 | 1.000 | 0.0023 | 0.0026 | 0.0025 | 9% | 0.759 | |
| | | 1.95 | 1.00 | 0.0052 | 0.0042 | 0.0047 | 15% | 1.44 | |
| | | 7.81 | 1.00 | 0.0143 | 0.0128 | 0.0135 | 8% | 6.20 | |
| | | 31.3 | 1.0 | 0.0425 | 0.0460 | 0.0443 | 6% | 20.3 | |
| | | 125 | 1 | 0.1219 | 0.1218 | 0.1218 | 0% | 55.8 | |
| | | 500 | 1 | 0.2290 | 0.2183 | 0.2236 | 3% | 102.4 | |

An additional anti-UBE3A antibody 3E5 (SAB1404508-100 ug, Millipore-Sigma) was evaluated either as a capture antibody or a detector antibody, in combination with GTX, Novus, or MS 2F6, using both the two-step and three-step formats. The same conditions as those shown in Tables 3 and 5 were used. As shown in Table 8, GTX as the capture antibody and the MS 3E5 as the detector antibody showed a strong signal throughout the curve; however, MS 2F6 as the capture antibody and MS 3E5 as the detector antibody showed better signal to background ratio for lower end of the curve. Similar results were obtained from the two-step format (Table 9). Higher AEBs were observed for the combination of GTX as the capture antibody and MS 3E5 as the detector antibody at 1 ng/mL and 10 ng/mL UBE3a levels, when compared to other combinations. However, MS 2F6 as the capture antibody and MS 3E5 as the detector antibody showed better signal to background ratio for lower end of the curve.

TABLE 8

| Capture/Detector Combination | Sample Concentration (ng/ml) | AEB1 | AEB2 | Ave AEB | AEB CV | Signal to Background |
|---|---|---|---|---|---|---|
| MS3E5 bead, GTX detector | 0 | 0.0548 | 0.0525 | 0.0537 | 3% | — |
| | 0.01 | 0.0515 | 0.0500 | 0.0508 | 2% | 0.946 |
| | 0.1 | 0.0546 | 0.0600 | 0.0573 | 7% | 1.07 |
| | 1 | 0.0655 | 0.0625 | 0.0640 | 3% | 1.19 |
| | 10 | 0.1515 | 0.1455 | 0.1485 | 3% | 2.77 |
| MS3E5 bead, Novus detector | 0 | 0.0035 | 0.0032 | 0.0033 | 6% | — |
| | 0.01 | 0.0038 | 0.0032 | 0.0035 | 14% | 1.05 |
| | 0.1 | 0.0026 | 0.0025 | 0.0025 | 1% | 0.765 |
| | 1 | 0.0040 | 0.0047 | 0.0044 | 12% | 1.31 |
| | 10 | 0.0157 | 0.0129 | 0.0143 | 14% | 4.29 |
| MS3E5 bead, MS 2F6 detector | 0 | 0.0080 | 0.0072 | 0.0076 | 8% | — |
| | 0.010 | 0.0052 | 0.0068 | 0.0060 | 18% | 0.792 |
| | 0.1 | 0.0078 | 0.0073 | 0.0075 | 5% | 0.990 |
| | 1 | 0.0090 | 0.0088 | 0.0089 | 1% | 1.17 |
| | 10 | 0.0203 | 0.0195 | 0.0199 | 3% | 2.62 |
| GTX bead, MS 3E5 detector | 0 | 0.0079 | 0.0091 | 0.0085 | 10% | — |
| | 0.01 | 0.0084 | 0.0082 | 0.0083 | 2% | 0.972 |
| | 0.1 | 0.0204 | 0.0181 | 0.0192 | 9% | 2.25 |
| | 1 | NaN | 0.0774 | 0.0774 | — | 9.06 |
| | 10 | 0.4035 | 0.4249 | 0.4142 | 4% | 48.5 |
| Novus bead, MS 3E5 detector | 0 | 0.0092 | 0.0098 | 0.0095 | 7% | — |
| | 0.01 | 0.0105 | 0.0102 | 0.0104 | 11% | 1.09 |
| | 0.1 | 0.0142 | 0.0119 | 0.0130 | 10% | 1.38 |
| | 1 | 0.0276 | 0.0233 | 0.0254 | 2% | 2.68 |
| | 10 | 0.1586 | 0.1540 | 0.1563 | 4% | 16.5 |
| MS 2F6 bead, MS 3E5 detector | 0 | 0.0041 | 0.0037 | 0.0039 | 13% | — |
| | 0.010 | 0.0035 | 0.0048 | 0.0042 | 15% | 1.06 |
| | 0.1 | 0.0063 | 0.0064 | 0.0063 | 13% | 1.62 |
| | 1 | 0.0206 | 0.0228 | 0.0217 | 4% | 5.52 |
| | 10 | 0.1775 | 0.1883 | 0.1829 | 1% | 46.6 |

TABLE 9

| Capture/Detector Combination | Sample Concentration (ng/ml) | AEB1 | AEB2 | Ave AEB | AEB CV | Signal to Background |
|---|---|---|---|---|---|---|
| MS3E5 bead, GTX detector | 0 | 0.1450 | 0.1381 | 0.1415 | 3% | — |
| | 0.01 | 0.1294 | 0.1340 | 0.1317 | 2% | 0.931 |
| | 0.1 | 0.1607 | 0.1495 | 0.1551 | 5% | 1.10 |
| | 1 | 0.1588 | 0.1653 | 0.1621 | 3% | 1.15 |
| | 10 | 0.4072 | 0.3845 | 0.3959 | 4% | 2.80 |
| MS3E5 bead, Novus detector | 0 | 0.0075 | 0.0073 | 0.0074 | 2% | — |
| | 0.01 | 0.0065 | 0.0070 | 0.0068 | 5% | 0.908 |
| | 0.1 | 0.0090 | 0.0091 | 0.0090 | 1% | 1.21 |
| | 1 | 0.0227 | 0.0226 | 0.0226 | 0% | 3.04 |
| | 10 | 0.1500 | 0.1398 | 0.1449 | 5% | 19.5 |
| MS3E5 bead, MS 2F6 detector | 0 | 0.0165 | 0.0167 | 0.0166 | 1% | — |
| | 0.01 | 0.0177 | 0.0160 | 0.0168 | 7% | 1.01 |
| | 0.1 | 0.0191 | 0.0180 | 0.0186 | 4% | 1.12 |
| | 1 | 0.0234 | 0.0226 | 0.0230 | 2% | 1.39 |
| | 10 | 0.0582 | 0.0565 | 0.0574 | 2% | 3.46 |
| GTX bead, MS 3E5 detector | 0 | NaN | NaN | — | — | — |
| | 0.01 | 0.0162 | 0.0168 | 0.0165 | 2% | — |
| | 0.1 | NaN | NaN | — | — | — |
| | 1 | 0.1520 | 0.1567 | 0.1544 | 2% | — |
| | 10 | 0.7237 | NaN | 0.7237 | — | — |
| Novus bead, MS 3E5 detector | 0 | 0.0237 | 0.0263 | 0.0250 | 7% | — |
| | 0.01 | 0.0302 | 0.0257 | 0.0280 | 11% | 1.12 |
| | 0.1 | 0.0237 | 0.0272 | 0.0255 | 10% | 1.02 |

TABLE 9-continued

| Capture/Detector Combination | Sample Concentration (ng/ml) | AEB1 | AEB2 | Ave AEB | AEB CV | Signal to Background |
|---|---|---|---|---|---|---|
| | 1 | 0.0412 | 0.0426 | 0.0419 | 2% | 1.68 |
| | 10 | 0.1741 | 0.1644 | 0.1693 | 4% | 6.77 |
| MS 2F6 bead, MS 3E5 detector | 0 | 0.0123 | 0.0102 | 0.0112 | 13% | — |
| | 0.01 | 0.0113 | 0.0141 | 0.0127 | 15% | 1.13 |
| | 0.1 | 0.0169 | 0.0141 | 0.0155 | 13% | 1.38 |
| | 1 | 0.0424 | 0.0451 | 0.0437 | 4% | 3.90 |
| | 10 | 0.3343 | 0.3378 | 0.3361 | 1% | 30.0 |

A head-to-head comparison of the top performing antibody pairs in both the two-step format and the three-step format was carried out. These antibody pairs were tested against a dilution curve of recombinant UBE3A. As shown in Tables 10 and 11, the combination of GTX as the capture antibody and MS 3E5 as the detector antibody under the three-step format was identified as the optimal assay condition with the lowest assay LOD and highest sensitivity.

TABLE 10

| Capture/Detector Combination | Sample Concentration (ng/ml) | AEB1 | AEB2 | Ave AEB | AEB CV | Signal to Background | LOD |
|---|---|---|---|---|---|---|---|
| GTX bead, Novus detector | 0 | 0.0022 | 0.0019 | 0.0021 | 11% | — | 0.0328 |
| | 0.032 | 0.0035 | 0.0027 | 0.0031 | 17% | 1.49 | |
| | 0.16 | 0.0038 | 0.0040 | 0.0039 | 5% | 1.88 | |
| | 0.80 | 0.0085 | 0.0124 | 0.0105 | 26% | 5.03 | |
| | 4.00 | 0.0402 | 0.0398 | 0.0400 | 1% | 19.2 | |
| | 20.0 | 0.1320 | 0.1311 | 0.1316 | 1% | 63.2 | |
| | 100 | 0.2934 | 0.2882 | 0.2908 | 1% | 140 | |
| | 500 | 0.2822 | 0.3093 | 0.2957 | 6% | 142 | |
| GTX bead, MS 3E5 detector | 0 | 0.0234 | 0.0221 | 0.0227 | 4% | — | 0.0173 |
| | 0.032 | 0.0310 | 0.0329 | 0.0319 | 4% | 1.41 | |
| | 0.16 | 0.0558 | 0.0571 | 0.0564 | 2% | 2.48 | |
| | 0.80 | 0.1439 | 0.1397 | 0.1418 | 2% | 6.24 | |
| | 4.00 | 0.3609 | 0.3619 | 0.3614 | 0% | 15.9 | |
| | 20.0 | 2.2568 | 2.4486 | 2.3527 | 6% | 104 | |
| | 100 | 4.2953 | 4.0826 | 4.1890 | 4% | 184 | |
| | 500 | 12.2579 | 11.6411 | 11.9495 | 4% | 526 | |
| MS 2F6 bead, MS 3E5 detector | 0 | 0.0144 | 0.0126 | 0.0135 | 9% | — | 0.1211 |
| | 0.032 | 0.0162 | 0.0146 | 0.0154 | 7% | 1.14 | |
| | 0.16 | 0.0183 | 0.0155 | 0.0169 | 12% | 1.25 | |
| | 0.80 | 0.0353 | 0.0370 | 0.0361 | 3% | 2.67 | |
| | 4.00 | 0.1320 | 0.1271 | 0.1295 | 3% | 9.58 | |
| | 20.0 | 0.5145 | 0.5520 | 0.5333 | 5% | 39.4 | |
| | 100 | 2.7130 | 2.8789 | 2.7960 | 4% | 207 | |
| | 500 | 10.9601 | 10.9142 | 10.9371 | 0% | 809 | |

TABLE 11

| Capture/Detector Combination | Sample Concentration (ng/ml) | AEB1 | AEB2 | Ave AEB | AEB CV | Signal to Background | LOD |
|---|---|---|---|---|---|---|---|
| GTX bead, MS 3E5 detector | 0 | 0.0077 | 0.0087 | 0.0082 | 9% | — | 0.0089 |
| | 0.032 | 0.0127 | 0.0142 | 0.0135 | 8% | 1.65 | |
| | 0.16 | 0.0288 | 0.0291 | 0.0289 | 1% | 3.53 | |
| | 0.80 | 0.0916 | 0.0961 | 0.0939 | 3% | 11.5 | |
| | 4.00 | 0.2694 | 0.2615 | 0.2655 | 2% | 32.4 | |
| | 20.0 | 0.7803 | 0.8205 | 0.8004 | 4% | 97.8 | |
| | 100 | 3.3487 | 3.5060 | 3.4273 | 3% | 419 | |
| | 500 | 9.9682 | 10.2678 | 10.1180 | 2% | 1236 | |

TABLE 11-continued

| Capture/Detector Combination | Sample Concentration (ng/ml) | AEB1 | AEB2 | Ave AEB | AEB CV | Signal to Background | LOD |
|---|---|---|---|---|---|---|---|
| MS 2F6 bead, | 0 | 0.0038 | 0.0038 | 0.0038 | 1% | — | 0.0581 |
| MS 3E5 detector | 0.032 | 0.0032 | 0.0043 | 0.0037 | 20% | 0.986 | |
| | 0.16 | 0.0071 | 0.0078 | 0.0074 | 7% | 1.96 | |
| | 0.80 | 0.0183 | 0.0197 | 0.0190 | 5% | 5.03 | |
| | 4.00 | 0.0868 | 0.0803 | 0.0836 | 5% | 22.1 | |
| | 20.0 | 0.3516 | 0.3483 | 0.3500 | 1% | 92.5 | |
| | 100 | 1.7911 | 1.8354 | 1.8133 | 2% | 479 | |
| | 500 | 8.9003 | 8.5973 | 8.7488 | 2% | 2312 | |

Next an initial run was carried out, using the 3-step format and the GTX/MS 3E5 combination. The recombinant UBE3A solution was incubated with the GTX-conjugated beads for 120 minutes, which is followed by 5 minutes of incubation with the detector antibody, and 5 minutes of incubation with SBG. Results are shown in Table 12.

TABLE 12

| Reagent Combination | Concentration (ng/ml) | AEB1 | AEB2 | Ave AEB | AEB CV | Signal to Background | LOD (pg/ml) | LLOQ (pg/ml) |
|---|---|---|---|---|---|---|---|---|
| GTX Bead, | 0.00 | 0.0018 | 0.0016 | 0.0017 | 8% | — | 0.662 | 12.0 |
| 3E5 detector | 0.00640 | 0.0054 | 0.0055 | 0.0055 | 1% | 3.22 | | |
| | 0.0320 | 0.0115 | 0.0095 | 0.0105 | 13% | 6.15 | | |
| | 0.160 | 0.0398 | 0.0389 | 0.0393 | 2% | 23.1 | | |
| | 0.800 | 0.1511 | 0.1539 | 0.1525 | 1% | 89.4 | | |
| | 4.00 | 0.5335 | 0.5501 | 0.5418 | 2% | 318 | | |
| | 20.0 | 2.7963 | 2.8794 | 2.8378 | 2% | 1664 | | |
| | 100 | 7.8585 | 8.1244 | 7.9914 | 2% | 4687 | | |
| | 500 | 16.8093 | 16.7680 | 16.7886 | 0% | 9847 | | |

Further optimization of the protocol included modifying the concentration of the capture antibody 3E5 (Table 13). 0.1 μg/mL of 3E5 was selected. Table 14 shows results from modifications of streptavidin β-galactosidase (SBG) concentrations. 100 pm SBG was selected.

TABLE 13

| Reagent Combination | Concentration (ng/ml) | AEB1 | AEB2 | AEB3 | Average AEB | AEB CV | Signal to Background | LOD (pg/ml) | LLOQ (pg/ml) |
|---|---|---|---|---|---|---|---|---|---|
| GTX Bead, | 0 | 0.0183 | 0.0183 | 0.0213 | 0.0193 | 9% | — | 4.92 | 43.0 |
| 0.1 ug/ml | 0.00128 | 0.0242 | 0.0239 | 0.0247 | 0.0243 | 2% | 1.26 | | |
| 3E5 detector | 0.00640 | 0.0251 | 0.0238 | 0.0256 | 0.0248 | 4% | 1.29 | | |
| | 0.0320 | 0.0351 | 0.0400 | 0.0401 | 0.0384 | 8% | 1.99 | | |
| | 0.160 | 0.0828 | 0.0846 | | 0.0837 | 2% | 4.34 | | |
| | 0.800 | 0.2566 | 0.2695 | 0.2449 | 0.2570 | 5% | 13.3 | | |
| | 4.00 | 0.8476 | 0.8915 | 0.8783 | 0.8725 | 3% | 45.3 | | |
| | 20.0 | 5.1061 | 5.6237 | 5.2046 | 5.3115 | 5% | 276 | | |
| GTX Bead, | 0 | 0.0384 | 0.0399 | 0.0395 | 0.0393 | 2% | — | 14.3 | 56.0 |
| 0.2 ug/ml | 0.00128 | 0.0457 | 0.0439 | 0.0421 | 0.0439 | 4% | 1.12 | | |
| 3E5 detector | 0.00640 | 0.0421 | 0.0466 | 0.0433 | 0.0440 | 5% | 1.12 | | |
| | 0.0320 | 0.0619 | 0.0621 | 0.0587 | 0.0609 | 3% | 1.55 | | |
| | 0.160 | 0.1253 | 0.1227 | 0.1215 | 0.1232 | 2% | 3.14 | | |
| | 0.800 | 0.3548 | 0.3780 | 0.3582 | 0.3636 | 3% | 9.26 | | |
| | 4.00 | 1.1782 | 2.3185 | 1.1776 | 1.5581 | 42% | 39.7 | | |
| | 20.0 | 6.3769 | 6.9456 | 6.7713 | 6.6979 | 4% | 171 | | |
| GTX Bead, | 0 | 0.0618 | 0.0597 | 0.0664 | 0.0626 | 5% | — | 15.9 | 68.0 |
| 0.4 ug/ml | 0.00128 | 0.0769 | 0.0720 | 0.0724 | 0.0738 | 4% | 1.18 | | |
| 3E5 detector | 0.00640 | 0.0671 | 0.0638 | 0.0865 | 0.0725 | 17% | 1.16 | | |
| | 0.0320 | 0.0958 | 0.0924 | 0.0950 | 0.0944 | 2% | 1.51 | | |
| | 0.160 | 0.1722 | 0.1652 | 0.1741 | 0.1705 | 3% | 2.72 | | |
| | 0.800 | 0.5092 | 0.4801 | 0.4784 | 0.4892 | 4% | 7.81 | | |
| | 4.00 | 2.3043 | 2.5815 | 2.4009 | 2.4289 | 6% | 38.8 | | |
| | 20.0 | 6.8245 | 7.9012 | 7.6665 | 7.4641 | 8% | 119 | | |

TABLE 13-continued

| Reagent Combination | Concentration (ng/ml) | AEB1 | AEB2 | AEB3 | Average AEB | AEB CV | Signal to Background | LOD (pg/ml) | LLOQ (pg/ml) |
|---|---|---|---|---|---|---|---|---|---|
| GTX Bead, 0.8 ug/ml 3E5 detector | 0 | 0.1184 | 0.1254 | 0.1237 | 0.1225 | 3% | — | 60.3 | 102 |
| | 0.00128 | 0.1090 | 0.1086 | 0.1120 | 0.1099 | 2% | 0.897 | | |
| | 0.00640 | 0.1144 | 0.1270 | 0.1173 | 0.1196 | 6% | 0.976 | | |
| | 0.0320 | 0.1442 | 0.1379 | 0.1516 | 0.1446 | 5% | 1.18 | | |
| | 0.160 | 0.2348 | 0.2631 | 0.2257 | 0.2412 | 8% | 1.97 | | |
| | 0.800 | 0.5889 | 0.6050 | 0.6149 | 0.6029 | 2% | 4.92 | | |
| | 4.00 | 3.1803 | 3.3754 | 3.1580 | 3.2379 | 4% | 26.4 | | |
| | 20.0 | 9.1622 | 10.3127 | 9.3743 | 9.6164 | 6% | 78.5 | | |

TABLE 14

| Cure/Detector Combination | Concentration (ng/ml) | AEB1 | AEB2 | AEB3 | Average AEB | AEB CV | Signal to Background | LOD (pg/ml) | LLOQ (pg/ml) |
|---|---|---|---|---|---|---|---|---|---|
| GTX Bead, 3E5 detector, 150 pm SI | 0 | 0.0141 | 0.0128 | 0.0129 | 0.0133 | 6% | — | 7.77 | 27.0 |
| | 0.00128 | 0.0130 | 0.0180 | 0.0134 | 0.0148 | 19% | 1.12 | | |
| | 0.00640 | 0.0136 | 0.0149 | 0.0140 | 0.0142 | 5% | 1.07 | | |
| | 0.0320 | 0.0262 | 0.0285 | 0.0282 | 0.0276 | 4% | 2.08 | | |
| | 0.160 | 0.0773 | 0.0769 | | 0.0771 | 0% | 5.82 | | |
| | 0.800 | 0.2711 | 0.2847 | 0.2786 | 0.2781 | 2% | 20.97 | | |
| | 4.00 | 0.9068 | 0.9377 | 0.9272 | 0.9239 | 2% | 69.65 | | |
| | 20.0 | 5.8704 | 5.5732 | 5.7222 | 5.7219 | 3% | 431.37 | | |
| GTX Bead, 3E5 detector, 100 pm SI | 0 | 0.0091 | 0.0079 | 0.0082 | 0.0084 | 7% | — | 5.53 | 24.0 |
| | 0.00128 | 0.0082 | 0.0092 | 0.0096 | 0.0090 | 8% | 1.07 | | |
| | 0.00640 | 0.0098 | 0.0098 | 0.0111 | 0.0103 | 7% | 1.22 | | |
| | 0.0320 | 0.0199 | 0.0201 | 0.0192 | 0.0197 | 2% | 2.35 | | |
| | 0.160 | 0.0582 | 0.0586 | 0.0574 | 0.0581 | 1% | 6.93 | | |
| | 0.800 | 0.2101 | 0.2145 | 0.2111 | 0.2119 | 1% | 25.27 | | |
| | 4.00 | 0.7390 | 0.7799 | 0.7067 | 0.7419 | 5% | 88.50 | | |
| | 20.0 | 3.9620 | 3.9703 | 4.0984 | 4.0102 | 2% | 478.37 | | |
| GTX Bead, 3E5 detector, 75 pm SI | 0 | 0.0031 | 0.0051 | 0.0049 | 0.0044 | 25% | — | 5.11 | 32.0 |
| | 0.00128 | 0.0046 | 0.0045 | 0.0047 | 0.0046 | 3% | 1.06 | | |
| | 0.00640 | 0.0059 | 0.0047 | 0.0074 | 0.0060 | 23% | 1.36 | | |
| | 0.0320 | 0.0091 | 0.0117 | 0.0116 | 0.0108 | 14% | 2.47 | | |
| | 0.160 | 0.0299 | 0.0294 | 0.0300 | 0.0298 | 1% | 6.82 | | |
| | 0.800 | 0.0780 | 0.1151 | 0.1256 | 0.1062 | 24% | 24.34 | | |
| | 4.00 | 0.4587 | 0.4603 | 0.4584 | 0.4591 | 0% | 105.21 | | |
| | 20.0 | 2.4444 | 2.8068 | 2.7500 | 2.6671 | 7% | 611.15 | | |

Addition of helper beads and varying 3E5 levels were tested in combination, and no helper beads were selected (Tables 15 and 16).

TABLE 15

| Reagent Combination | Concentration (ng/ml) | AEB1 | AEB2 | Average AEB | AEB CV | Signal to Background | LOD (pg/ml) | LLOQ (pg/ml) |
|---|---|---|---|---|---|---|---|---|
| GTX Bead/Helper Beads, 3E5 detector (0.1 ug/ml), 100 pm SBG | 0 | 0.0059 | 0.0053 | 0.0056 | 7% | — | 6.93 | 35.0 |
| | 0.00128 | 0.0065 | 0.0083 | 0.0074 | 17% | 1.29 | | |
| | 0.00640 | 0.0065 | 0.0045 | 0.0055 | 25% | 0.962 | | |
| | 0.0320 | 0.0159 | 0.0108 | 0.0134 | 27% | 2.33 | | |
| | 0.160 | 0.0417 | 0.0425 | 0.0421 | 1% | 7.34 | | |
| | 0.800 | 0.1665 | 0.1656 | 0.1660 | 0% | 29.0 | | |
| | 4.00 | 0.6395 | 0.6055 | 0.6225 | 4% | 109 | | |
| | 20.0 | 3.3690 | 3.4771 | 3.4231 | 2% | 597 | | |
| GTX Bead/Helper Beads, 3E5 detector (0.2 ug/ml), 100 pm SBG | 0 | 0.0103 | 0.0098 | 0.0100 | 3% | — | 4.28 | 31.0 |
| | 0.00128 | 0.0127 | 0.0115 | 0.0121 | 7% | 1.25 | | |
| | 0.00640 | 0.0133 | 0.0127 | 0.0130 | 3% | 1.34 | | |
| | 0.0320 | 0.0226 | 0.0236 | 0.0231 | 3% | 2.39 | | |
| | 0.160 | 0.0751 | 0.0703 | 0.0727 | 5% | 7.51 | | |
| | 0.800 | 0.2524 | 0.2608 | 0.2566 | 2% | 26.5 | | |
| | 4.00 | 0.8925 | 0.8455 | 0.8690 | 4% | 89.8 | | |
| | 20.0 | 5.6289 | 5.3912 | 5.5100 | 3% | 570 | | |
| GTX Bead/Helper Beads, 3E5 detector | 0 | 0.0190 | 0.0170 | 0.0180 | 8% | — | 4.15 | 33.0 |
| | 0.00128 | 0.0222 | 0.0178 | 0.0200 | 16% | 1.02 | | |
| | 0.00640 | 0.0326 | 0.0263 | 0.0294 | 15% | 1.51 | | |
| | 0.0320 | 0.0370 | 0.0369 | 0.0370 | 0% | 1.89 | | |

TABLE 15-continued

| Reagent Combination | Concentration (ng/ml) | AEB1 | AEB2 | Average AEB | AEB CV | Signal to Background | LOD (pg/ml) | LLOQ (pg/ml) |
|---|---|---|---|---|---|---|---|---|
| (0.4 ug/ml), 100 pm SBG | 0.160 | 0.0913 | 0.1052 | 0.0983 | 10% | 5.03 | | |
| | 0.800 | 0.3406 | 0.3329 | 0.3368 | 2% | 17.2 | | |
| | 4.00 | 1.1622 | 1.1241 | 1.1432 | 2% | 58.5 | | |
| | 20.0 | 4.4122 | 6.4531 | 5.4326 | 27% | 278 | | |

TABLE 16

| Reagent Combination | Concentration (ng/ml) | AEB1 | AEB2 | Average AEB | AEB CV | Signal to Background | LOD (pg/ml) | LLOQ (pg/ml) |
|---|---|---|---|---|---|---|---|---|
| GTX Bead, 3E5 detector (0.1 ug/ml), 100 pm SBG | 0 | 0.0054 | 0.0061 | 0.0057 | 8% | — | 4.18 | 32.0 |
| | 0.00128 | 0.0050 | 0.0075 | 0.0062 | 29% | 1.09 | | |
| | 0.00640 | 0.0087 | 0.0092 | 0.0089 | 4% | 1.56 | | |
| | 0.0320 | 0.0108 | 0.0159 | 0.0133 | 27% | 2.33 | | |
| | 0.160 | 0.0402 | 0.0395 | 0.0399 | 1% | 6.95 | | |
| | 0.800 | 0.1636 | 0.1568 | 0.1602 | 3% | 27.9 | | |
| | 4.00 | 0.6073 | 0.6025 | 0.6049 | 1% | 106 | | |
| | 20.0 | 3.5717 | 3.2145 | 3.3931 | 7% | 592 | | |
| GTX Bead, 3E5 detector (0.2 ug/ml), 100 pm SBG | 0 | 0.0094 | 0.0099 | 0.0097 | 4% | — | 4.38 | 24.0 |
| | 0.00128 | 0.0099 | 0.0139 | 0.0119 | 24% | 1.23 | | |
| | 0.00640 | — | 0.0120 | 0.0120 | — | 1.24 | | |
| | 0.0320 | 0.0229 | 0.0244 | 0.0236 | 4% | 2.44 | | |
| | 0.160 | 0.0675 | 0.0686 | 0.0680 | 1% | 7.03 | | |
| | 0.800 | 0.2503 | 0.2472 | 0.2487 | 1% | 25.7 | | |
| | 4.00 | 0.8779 | 0.8509 | 0.8644 | 2% | 89.4 | | |
| | 20.0 | 4.9554 | 4.9954 | 4.9754 | 1% | 514 | | |
| GTX Bead, 3E5 detector (0.4 ug/ml), 100 pm SBG | 0 | 0.0196 | 0.0194 | 0.0195 | 1% | — | 8.00 | 29.0 |
| | 0.00128 | 0.0195 | 0.0213 | 0.0204 | 6% | 1.04 | | |
| | 0.00640 | 0.0228 | 0.0232 | 0.0230 | 1% | 1.18 | | |
| | 0.0320 | 0.0366 | 0.0370 | 0.0368 | 1% | 1.88 | | |
| | 0.160 | 0.1004 | 0.1080 | 0.1042 | 5% | 5.33 | | |
| | 0.800 | 0.3352 | 0.3384 | 0.3368 | 1% | 17.2 | | |
| | 4.00 | 1.1023 | 1.1150 | 1.1086 | 1% | 56.7 | | |
| | 20.0 | 6.8013 | 6.3243 | 6.5628 | 5% | 336 | | |

Figure 2:
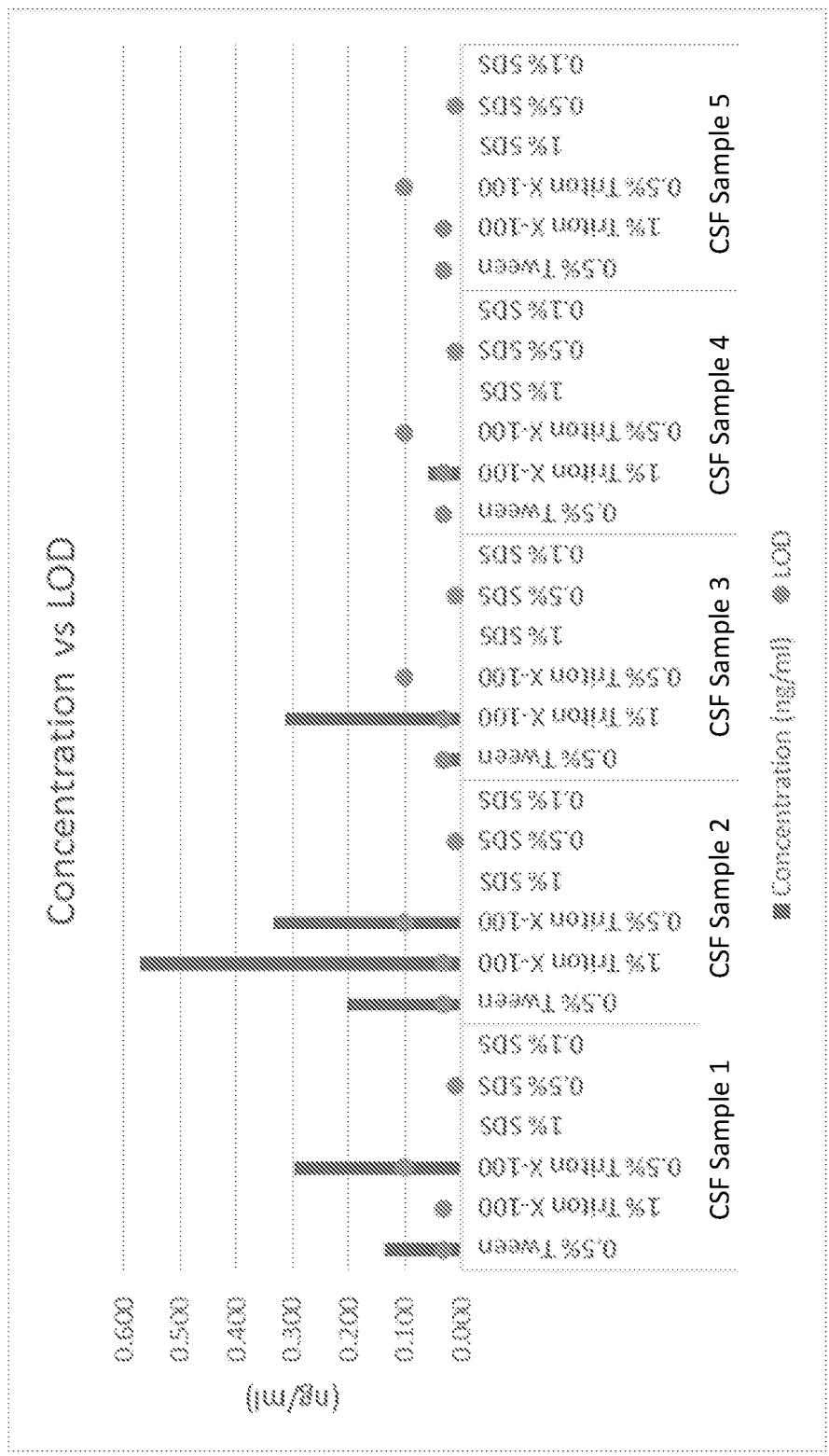
FIG. 2 is a diagram showing levels of the UBE3A protein detected in CSF samples subjected to various detergent conditions. Bars indicate concentration (ng/mL) and dots indicate LOD.

Next, CSF samples were subjected to various detergent conditions, including 0.5% Tween, 1% Triton X-100, 0.5% Triton X-100, 1% SDS, 0.5% SDS, and 0.1% SDS (FIG. 2). Ionic detergents such as SDS was shown to not be compatible with the assay. 1% Triton X-100 showed improved performance, with 3 of the 5 samples above limit of detection (LOD; 0.0308 ng/mL), and 2 above lower limit of quantitation (LLOQ; 0.118 ng/mL). 1% Triton X-100 was therefore selected as the optimal detergent condition.

Figure 3:
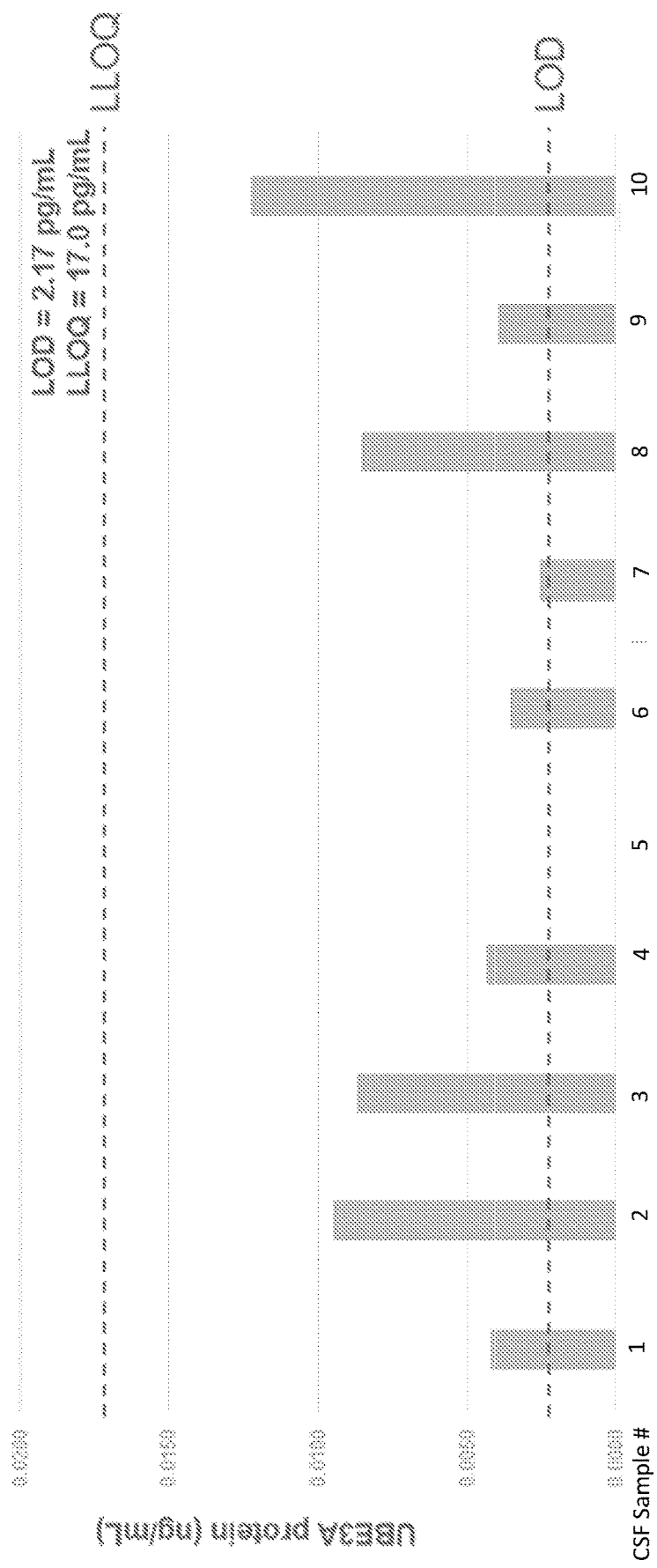
FIG. 3 is a diagram showing levels of the UBE3A protein detected in CSF samples using the Quanterix assay.

With the optimized antibody pair and assay conditions, 10 CSF samples were tested. 40 μL of CSF from 10 independent donors were ran in triplicates. The results (FIG. 3) showed that all 10 samples were below the LLOQ of the assay. Therefore, it was concluded that the assay was not suitable for detection of UBE3A in human CSF samples.

Example 2: LC-MS Based Detection of UBE3A

A liquid chromatography-mass spectrometry (LC-MS) protocol was developed for detecting UBE3A.

Sigma anti-UBE3A monoclonal antibody (clone 3E5, cat. SAB1404508-100 ug) was biotinylated using a Thermo Fisher biotinylation kit and then labeled onto M280 Streptavidin coated magnetic beads. 500 μL sample (including 500 μL CSF, or recombinant UBE3A) were placed in Eppendorf LoBind tubes. 50 μL of 10×RIPA lysis buffer (EMD Millipore cat. 20-188) was added to each sample. 10 μL of antibody-conjugated beads were added to each sample. Samples were incubated with beads on end over end mixer (HulaMixer) for 2 hours at 4° C. Samples were placed on a tube magnet and liquid was discarded. 1 mL PBS+Tween-20 (0.01%) was added to each tube and then mixed on an end over end mixer (Hulamixer) at room temperature for 1 minute. Samples were put on a magnet and liquid was discarded. 1 mL PBS was added to each tube and then mixed on an end over end mixer (Hulamixer) at room temperature for 1 minute. Samples were put on a magnet and liquid was discarded. 0.5 mL PBS was added to each tube and then mixed on an end over end mixer (Hulamixer) at room temperature for 1 minute. Samples were put on a magnet and liquid was discarded. TPCK-treated trypsin (Worthington cat. LS003740) was made up to 1 mg/mL in PBS. Trypsin was then diluted by adding 3 μL/450 μL of PBS to make the digestion solution. 45 μL of the digestion solution was added to each tube with beads. Samples were placed on Thermo-Mixer at 40° C. for 1.5 hrs. 5 μL of 20% acetonitrile and 1% formic acid were added to each sample. Samples were put on a magnet and final solution (50 μL) was added to plate for LC-MS analysis. Detectable peptides in the human UBE3A protein, and the relative abundance of these peptides can be found in Table 17. The detectable peptides are listed in the column "sequence" and the relative abundance can be found in the "area" column. "A2" refers to "detection confidence", and represents the confidence of the mass spectrometry system for detection of the particular peptide.

TABLE 17

| A2 | Sequence | # Peptide spectrum matches (PSMs) | # Proteins | # Modifications | Area | Charge | MH+ [Da] | # Missed Cleavages |
|---|---|---|---|---|---|---|---|---|
| High | KPLIPFEEFINEPLNEVLEMDKDYTFFK | 10 | 1 | | 5.024E10 | 3 | 3445.73325 | 1 |
| High | LEMIAMENPADLKK | 8 | 1 | | 3.550E10 | 2 | 1602.82329 | 1 |
| High | NLVNDDDAIVAASK | 12 | 1 | | 3.430E10 | 2 | 1444.73296 | 0 |
| High | DHIIDDALVR | 12 | 1 | | 2.436E10 | 3 | 1166.61893 | 0 |
| High | VFSSAEALVQSFR | 24 | 1 | | 2.407E10 | 2 | 1440.74529 | 0 |
| High | MMETFQQLITYK | 13 | 1 | | 2.341E10 | 2 | 1532.74224 | 0 |
| High | VDPLETELGVK | 9 | 1 | | 2.043E10 | 1 | 1199.65247 | 0 |
| High | LGPDDVSVDIDAIR | 12 | 1 | | 1.968E10 | 2 | 1484.75810 | 0 |
| High | EFVNLYSDYILNK | 20 | 1 | | 1.777E10 | 2 | 1617.82781 | 0 |
| High | DVTYLTEEK | 7 | 1 | | 1.493E10 | 2 | 1097.54485 | 0 |
| High | NLDFQALEETTEYDGGYTR | 18 | 1 | | 1.446E10 | 2 | 2222.00127 | 0 |
| High | EREDYSPLIR | 8 | 1 | | 1.288E10 | 2 | 1277.64910 | 1 |
| High | NLGLYYDNR | 19 | 1 | | 1.266E10 | 1 | 1127.54614 | 0 |
| High | GFHMVTNESPLK | 8 | 1 | | 1.234E10 | 1 | 1359.67273 | 0 |
| High | DLGDSHPVLYQSLK | 7 | 1 | | 1.206E10 | 1 | 1571.81067 | 0 |
| High | LEMIAMENPADLK | 4 | 1 | | 1.096E10 | 1 | 1474.72864 | 0 |
| High | LFLQHTTGIDR | 33 | 1 | | 1.052E10 | 2 | 1298.68401 | 0 |
| High | EFWEIVHSFTDEQKR | 9 | 1 | | 9.371E9 | 3 | 1950.93546 | 1 |
| Low | GFGML | 3 | 1 | | 7.608E9 | 1 | 524.25494 | 0 |
| High | RGFHMVTNESPLK | 6 | 1 | | 6.039E9 | 3 | 1515.77451 | 1 |
| High | EFWEIVHSFTDEQK | 5 | 1 | | 5.927E9 | 2 | 1794.83733 | 0 |
| High | LGPDDVSVDIDAIRR | 2 | 1 | | 5.824E9 | 3 | 1640.86429 | 1 |
| High | DPNYLNLFIIVMENR | 18 | 1 | | 5.347E9 | 2 | 1850.95610 | 0 |
| High | RDHIIDDALVR | 7 | 1 | | 5.007E9 | 3 | 1322.71186 | 1 |
| High | KPLIPFEEFINEPLNEVLEMDK | 2 | 1 | | 3.963E9 | 2 | 2644.33794 | 0 |
| High | QLYVEFEGEQGVDEGGVSK | 74 | 1 | | 3.754E9 | 2 | 2069.97612 | 0 |
| High | ENGDKIPITNENR | 5 | 1 | | 3.688E9 | 2 | 1499.74541 | 1 |
| High | EDYSPLIR | 5 | 1 | | 3.498E9 | 2 | 992.50609 | 0 |
| High | LFLQHTTGTDRAPVGGLGK | 2 | 1 | | 1.627E9 | 2 | 1978.07500 | 1 |
| High | EFFQLVVEEIFNPDIGMFTYDESTK | 29 | 1 | | 1.451E9 | 3 | 2998.42453 | 0 |

TABLE 17-continued

| A2 | Sequence | # Peptide spectrum matches (PSMs) | # Proteins | Modifications | Area | Charge | MH+ [Da] | # Missed Cleavages |
|---|---|---|---|---|---|---|---|---|
| Low | GFGmL | 1 | 1 | M4(Oxidation) | 1.383E9 | 1 | 540.24927 | 0 |
| High | VISNEFNSR | 2 | 1 | | 1.312E9 | 2 | 1065.53398 | 0 |
| High | DLLEYEGNVEDDMMITFQISQTDLFGNPMMYDLK | 27 | 1 | | 1.136E9 | 3 | 4015.78708 | 0 |
| High | RMMETFQQLITYK | 3 | 1 | | 1.050E9 | 2 | 1688.84917 | 1 |
| High | KPLIPFEEFINEPLNEVLEMDKDYTFFKVETENK | 2 | 1 | | 1.042E9 | 3 | 4146.07175 | 2 |
| High | RLFLQFTTGTDR | 1 | 1 | | 6.141E8 | 3 | 1454.77530 | 1 |
| High | KPLIPFEEFInEPLnEVLEMDKDYTFFK | 8 | 1 | N11 (Deamidated); N15 (Deamidated) | 5.963E8 | 3 | 3447.68772 | 1 |
| High | KPLIPFEEFINEPLNEVLEmDKDYTFFK | 1 | 1 | M20(Oxidation) | 5.790E8 | 4 | 3461.74257 | 1 |
| Low | DYTFFK | 2 | 1 | | 5.233E8 | 1 | 820.38733 | 0 |
| High | MVYYANVVGGEVDTNHnEEDDEEPIPESSELTLqELLGEER | 24 | 1 | N17 (Deamidated); Q34 (Deamidated) | 4.991E8 | 3 | 4651.07956 | 0 |
| High | ITVLYSLVQGQQLNPYLR | 2 | 1 | | 4.270E8 | 2 | 2105.17485 | 0 |
| High | vFSSAEALVQSFR | 2 | 1 | N-Term (Acetyl) | 4.112E8 | 2 | 1482.76067 | 0 |
| High | KQLYVEFEGEQGVDEGGVSK | 3 | 1 | | 3.619E8 | 3 | 2198.06137 | 1 |
| High | eFVNLYSDYILNK | 1 | 1 | N-Term (Acetyl) | 3.319E8 | 2 | 1659.82842 | 0 |
| High | AMSKLPLAAQGKd | 4 | 1 | | 2.498E8 | 1 | 1214.69373 | 1 |
| High | HIIDDALVR | 2 | 1 | N-Term (Acetyl) | 2.498E8 | 2 | 1208.62480 | 0 |
| High | KEFVNLYSDYILNK | 2 | 1 | | 2.449E8 | 2 | 1745.90849 | 1 |
| High | LEMIAmENPADLK | 8 | 1 | M6(Oxidation) | 2.425E8 | 2 | 1618.82292 | 1 |
| High | EnGDKIPITNENR | 3 | 1 | N2 (Deamidated) | 2.235E8 | 2 | 1500.72893 | 1 |
| High | eFWEIVHSFTDEQKR | 2 | 1 | N-Term (Acetyl) | 2.123E8 | 3 | 1992.94443 | 1 |
| High | eREDYSPLIR | 2 | 1 | N-Term (Acetyl) | 2.108E8 | 2 | 1319.65788 | 1 |
| High | IFLQHTTGTDR | 2 | 1 | N-Term (Acetyl) | 1.743E8 | 2 | 1340.68913 | 0 |

TABLE 17-continued

| A2 | Sequence | # Peptide spectrum matches (PSMs) | # Proteins | Modifications | Area | Charge | MH+ [Da] | # Missed Cleavages |
|---|---|---|---|---|---|---|---|---|
| Low | dSVLIR | 2 | 1 | N-Term (Acetyl) | 1.344E8 | 2 | 744.42674 | 0 |
| High | MmETFQQLITYK | 2 | 1 | M2 (Oxidation) | 1.308E8 | 2 | 1548.75102 | 0 |
| High | mMETFQQLITYK | 2 | 1 | N-Term (Acetyl) | 1.259E8 | 2 | 1574.75066 | 0 |
| High | GFHmVTNESPLK | 4 | 1 | M4 (Oxidation) | 1.258E8 | 2 | 1375.66850 | 0 |
| High | NLDFqALEETTEYDGGYTR | 26 | 1 | Q5 (Deamidated) | 1.191E8 | 2 | 2222.99150 | 0 |
| High | enGDKIPITNENRK | 8 | 1 | N-Term (Acetyl); N2 (Deamidated) | 1.032E8 | 3 | 1670.83957 | 2 |
| High | SGEPQSDDIEASR | 1 | 1 | N-Term (Acetyl) | 8.131E7 | 2 | 1432.61882 | 0 |
| High | nLVNDDDAIVAASK | 4 | 1 | N1 (Deamidated) | 8.056E7 | 2 | 1445.72197 | 0 |
| High | GFHMVTnESPLK | 3 | 1 | N7 (Deamidated) | 6.287E7 | 3 | 1360.66944 | 0 |
| Medium | RGFHmVTNESPLK | 4 | 1 | M5 (Oxidation) | 6.278E7 | 4 | 1531.77468 | 1 |
| High | RLFLQHTTGTDRAPVGGLGK | 1 | 1 |  | 5.906E7 | 3 | 2134.18540 | 2 |
| High | eNGDKIPITNENRK | 3 | 1 | N-Term (Acetyl) | 5.650E7 | 4 | 1669.85354 | 2 |
| Medium | ENGDKIPITnENRK | 6 | 1 | N10 (Deamidated) | 5.440E7 | 3 | 1628.83097 | 2 |
| Low | aLELYK | 2 | 1 | N-Term (Acetyl) | 5.338E7 | 2 | 778.43724 | 0 |
| High | eNGDKIPITNENR | 2 | 1 | N-Term (Acetyl) | 5.244E7 | 2 | 1541.74846 | 1 |
| High | rDHIIDDALVR | 2 | 1 | N-Term (Acetyl) | 4.708E7 | 3 | 1364.73520 | 1 |
| High | SGEPQSDDIEASR | 1 | 1 |  | 4.263E7 | 2 | 1390.61089 | 0 |
| High | LEmIAmENPADLK | 2 | 1 | M3 (Oxidation); M6 (Oxidation) | 4.099E7 | 3 | 1634.81687 | 1 |
| High | nLGLYYDNR | 1 | 1 | N-Term (Acetyl) | 3.866E7 | 2 | 1169.56377 | 0 |
| Low | mVYYAnVVGGEVDTNHNEEDDEEPIPESSELTLQELLGEER | 3 | 1 | M1 (Oxidation); N6 (Deamidated) | 3.862E7 | 4 | 4666.12417 | 0 |

TABLE 17-continued

| A2 | Sequence | # Peptide spectrum matches (PSMs) | # Proteins | Modifications | Area | Charge | MH+ [Da] | # Missed Cleavages |
|---|---|---|---|---|---|---|---|---|
| High | KQLYVEFEGEqGVDEGGVSK | 2 | 1 | Q11 (Deamidated) | 3.558E7 | 3 | 2199.06479 | 1 |
| High | IEMIAMENPADLKK | 1 | 1 | N-Term (Acetyl) | 3.486E7 | 3 | 1644.83530 | 1 |
| High | dLGDSHPVLYQSLK | 1 | 1 | N-Term (Acetyl) | 3.432E7 | 2 | 1613.81536 | 0 |
| High | eFFQLWEEIFnPDIGmFTYDESTK | 2 | 1 | N-Term (Acetyl); N12 (Deamidated); M17 (Oxidation) | 3.418E7 | 3 | 3057.40921 | 0 |
| High | MVYYAnVVGGEVDTnHnEEDDEEPIPESSELTLQELLGEER | 14 | 1 | N6 (Deamidated); N15 (Deamidated); N17 (Deamidated) | 3.277E7 | 3 | 4652.08408 | 0 |
| High | EFFQLVVEEIFnPIGmFTYDESTKD | 6 | 1 | N12 (Deamidated); M17 (Oxidation) | 2.915E7 | 3 | 3015.41159 | 0 |
| High | DLLEYEGNVEDDMMITFqISqTDLFGNPMMYDLK | 8 | 1 | Q18 (Deamidated); Q21 (Deamidated) | 2.762E7 | 3 | 4017.77414 | 0 |
| High | DLLEYEGNVEDDMMITFqISQTDLFGNPMMYDLK | 2 | 1 | Q18 (Deamidated) | 2.323E7 | 3 | 4016.82236 | 0 |
| High | EFFQLVVEEIFnPDIGMFTYDESTK | 38 | 1 | N12 (Deamidated) | 2.248E7 | 2 | 2999.41362 | 0 |
| High | vISNEFNSR | 1 | 1 | N-Term (Acetyl) | 2.181E7 | 2 | 1107.54521 | 0 |
| High | DLLEYEGNVEDDMmITFqISQTDLFGNPMMYDLK | 18 | 1 | M14 (Oxidation) Q18 (Deamidated) | 2.119E7 | 3 | 4032.80600 | 0 |
| High | dVTYLTEEK | 1 | 1 | N-Term (Acetyl) | 2.039E7 | 2 | 1139.54619 | 0 |
| High | EFVnLYSDYILNK | 4 | 1 | N4 (Deamidated) | 1.748E7 | 2 | 1618.80608 | 0 |
| Low | gFGML | 1 | 1 | N-Term (Acetyl) | 1.707E7 | 1 | 566.26758 | 0 |
| High | qLYVEFEGEQGVDEGGVSK | 30 | 1 | Q1 (Deamidated) | 1.657E7 | 2 | 2070.96465 | 0 |

TABLE 17-continued

| A2 | Sequence | # Peptide spectrum matches (PSMs) | # Proteins | Modifications | Area | Charge | MH+ [Da] | # Missed Cleavages |
|---|---|---|---|---|---|---|---|---|
| High | KPLIPFEEFInEPLNEVLEMDKDYTFFK | 18 | 1 | N11 (Deamidated) | 1.652E7 | 3 | 3446.74472 | 1 |
| High | EFFqLVVEEIFnPDIGMFTYDESTK | 9 | 1 | Q4 (Deamidated); N12 (Deamidated) | 1.375E7 | 3 | 3000.40354 | 0 |
| High | VISnEFNSR | 2 | 1 | N4 (Deamidated) | 1.324E7 | 2 | 1066.51714 | 0 |
| High | eFFQLVVEEIFnPDIGMFTYDESTK | 4 | 1 | N-Term (Acetyl); N12 (Deamidated) | 1.219E7 | 2 | 3041.40117 | 0 |
| High | eDYSPLIR | 1 | 1 | N-Term (Acetyl) | 1.183E7 | 2 | 1034.51506 | 0 |
| High | enGDKIPITNENR | 1 | 1 | N-Term (Acetyl); N2 (Deamidated) | 9.546E6 | 2 | 1542.74932 | 1 |
| High | DLLEYEGNVEDDMmITFqISqTDLFGnPMMYDLK | 3 | 1 | M14 (Oxidation) Q18 (Deamidated); Q21 (Deamidated); N27 (Deamidated) | 6.616E6 | 3 | 4034.78061 | 0 |
| High | mVYYANVVGGEVDTnHnEEDDEEPIPESSELTLQELLGEER | 2 | 1 | M1 (Oxidation); N15 (Deamidated); N17 (Deamidated) | 5.120E6 | 4 | 4667.05825 | 0 |
| Low | RGFHmVTnESPLK | 1 | 1 | M5 (Oxidation); N8 (Deamidated) | 4.924E6 | 3 | 1532.76688 | 1 |
| Low | ENGDKIPITNENRK | 3 | 1 | | 3.125E6 | 3 | 1627.84146 | 2 |
| Low | HLIER | 2 | 1 | | 3.092E6 | 2 | 667.39018 | 0 |
| High | IGDSSQGDNNLQK | 1 | 1 | | 2.137E6 | 2 | 1375.64824 | 0 |
| Medium | YNADQIR | 1 | 1 | | 1.506E6 | 2 | 879.43297 | 0 |
| Low | NGPDTER | 1 | 1 | | 1.442E6 | 2 | 788.35484 | 0 |
| Low | MYSER | 1 | 1 | | 5.242E5 | 2 | 685.29863 | 0 |
| Low | KGTFR | 1 | 1 | | 9.978E4 | 2 | 608.35253 | 1 |

TABLE 17-continued

| A2 | Sequence | # Peptide spectrum matches (PSMs) | # Proteins | Modifications | Area | Charge | MH+ [Da] | # Missed Cleavages |
|---|---|---|---|---|---|---|---|---|
| High | EFFQLWEEIFNPDIGmFTYDESTK | 13 | 1 | M17(Oxidation) | 0.000E0 | 3 | 3014.39463 | 0 |
| High | KPLIPFEEFInEPLNEVLEMDK | 4 | 1 | N11 (Deamidated) | 0.000E0 | 3 | 2645.35709 | 0 |
| High | DPNYLnLFIIVMENR | 4 | 1 | N6 (Deamidated) | 0.000E0 | 1 | 1851.94519 | 0 |
| High | eFWEIVHSFTDEQK | 3 | 1 | N-Term (Acetyl) | 0.000E0 | 2 | 1836.84673 | 0 |
| Low | VFSSAEALVqSFR | 3 | 1 | Q10 (Deamidated) | 0.000E0 | 2 | 1441.72222 | 0 |
| High | KPLIPFEEFInEPLNEVLEmDKDYTFFK | 2 | 1 | N11 (Deamidated); M20(Oxidation) | 0.000E0 | 3 | 3462.73130 | 1 |
| High | DLLEYEGNVEDDMMITFqISqTDLFGnPMMYDLK | 2 | 1 | Q18 (Deamidated); Q21 (Deamidated); N27 (Deamidated) | 0.000E0 | 3 | 4018.71860 | 0 |
| High | mVYYAnVVGGEVDTnHnEEDDEEPIPESSELTLQELLGEER | 2 | 1 | M1 (Oxidation); N6 (Deamidated); N15 (Deamidated); N17 (Deamidated) | 0.000E0 | 4 | 4668.09194 | 0 |
| High | dLLEYEGNVEDDMMITFqISqTDLFGNPMMYDLK | 2 | 1 | N-Term (Acetyl); Q18 (Deamidated); Q21 (Deamidated) | 0.000E0 | 3 | 4059.80710 | 0 |
| High | LEmIAMEnPADLK | 2 | 1 | M3(Oxidation); N8 (Deamidated) | 0.000E0 | 2 | 1491.71733 | 0 |
| Low | mIIAK | 2 | 1 | N-Term (Acetyl) | 0.000E0 | 2 | 617.37084 | 0 |
| Low | DLLEYEGNVEDDMmITFQISQTDLFGnPmmYDLK | 2 | 1 | M14(Oxidation) N27 (Deamidated); M29(Oxidation) M30(Oxidation) | 0.000E0 | 3 | 4064.78061 | 0 |

TABLE 17-continued

| A2 | Sequence | # Peptide spectrum matches (PSMs) | # Proteins | Modifications | Area | Charge | MH+ [Da] | # Missed Cleavages |
|---|---|---|---|---|---|---|---|---|
| High | nLDFqALEETTEYDGGYTR | 1 | 1 | N1 (Deamidated); Q5 (Deamidated) | 0.000E0 | 2 | 2223.94829 | 0 |
| High | eDYSPLIRVIGRVFSSAEALVQSFRe | 1 | 1 | N-Term (Acetyl) | 0.000E0 | 3 | 2881.49594 | 2 |
| High | FFqLVVEEIFnPDIGMFTYDESTK | 1 | 1 | N-Term (Acetyl); Q4 (Deamidated); N12 (Deamidated) | 0.000E0 | 2 | 3042.36577 | 0 |
| High | MDNNAAAIK | 1 | 1 | | 0.000E0 | 2 | 947.46037 | 0 |
| High | EFFqLWEEIFnPDIGmFTYDESTK | 1 | 1 | Q4 (Deamidated); N12 (Deamidated); M17 (Oxidation) | 0.000E0 | 3 | 3016.38443 | 0 |

The most abundant detectable peptides included: VFSSAEALVQSFR (SEQ ID NO:3), NLVNDDDAIVAASK (SEQ ID NO:4), VDPLETELGVK (SEQ ID NO:5), and LEMIAMENPADLKK (SEQ ID NO:6). These peptides are bolded in the sequence of UBE3A below:

(SEQ ID NO: 1)
MEKLHQCYWKSGEPQSDDIEASRMKRAAAKHLIER

YYHQLTEGCGNEACTNEFCASCPTFLRMDNNAAAI

KALELYKINAKLCDPHPSKKGASSAYLENSKGAPN

NSCSEIKMNKKGARIDFKDVTYLTEEKVYEILELC

REREDYSPLIRVIGRVFSSAEALVQSFRKVKQHTK

EELKSLQAKDEDKDEDEKEKAACSAAAMEEDSEAS

SSRIGDSSQGDNNLQKLGPDDVSVDIDAIRRVYTR

LLSNEKIETAFLNALVYLSPNVECDLTYHNVYSRD

PNYLNLFIIVMENRNLHSPEYLEMALPLFCKAMSK

LPLAAQGKLIRLWSKYNADQIRRMMETFQQLITYK

VISNEFNSRNLVNDDDAIVAASKCLKMVYYANVVG

GEVDTNHNEEDDEEPIPESSELTLQELLGEERRNK

KGPRVDPLETELGVKTLDCRKPLIPFEEFINEPLN

EVLEMDKDYTFFKVETENKFSFMTCPFILNAVTKN

LGLYYDNRIRMYSERRITVLYSLVQGQQLNPYLRL

KVRRDHIIDDALVRLEMIAMENPADLKKQLYVEFE

GEQGVDEGGVSKEFFQLVVEEIFNPDIGMFTYDES

TKLFWFNPSSFETEGQFTLIGIVLGLAIYNNCILD

VHFPMVVYRKLMGKKGTFRDLGDSHPVLYQSLKDL

LEYEGNVEDDMMITFQISQTDLFGNPMMYDLKENG

DKIPITNENRKEFVNLYSDYILNKSVEKQFKAFRR

GFHMVTNESPLKYLFRPEEIELLICGSRNLDFQAL

EETTEYDGGYTRDSVLIREFWEIVHSFTDEQKRLF

LQFTTGTDRAPVGGLGKLKMIIAKNGPDTERLPTS

HTCFNVLLLPEYSSKEKLKERLLKAITYAKGFGML

Figure 4:
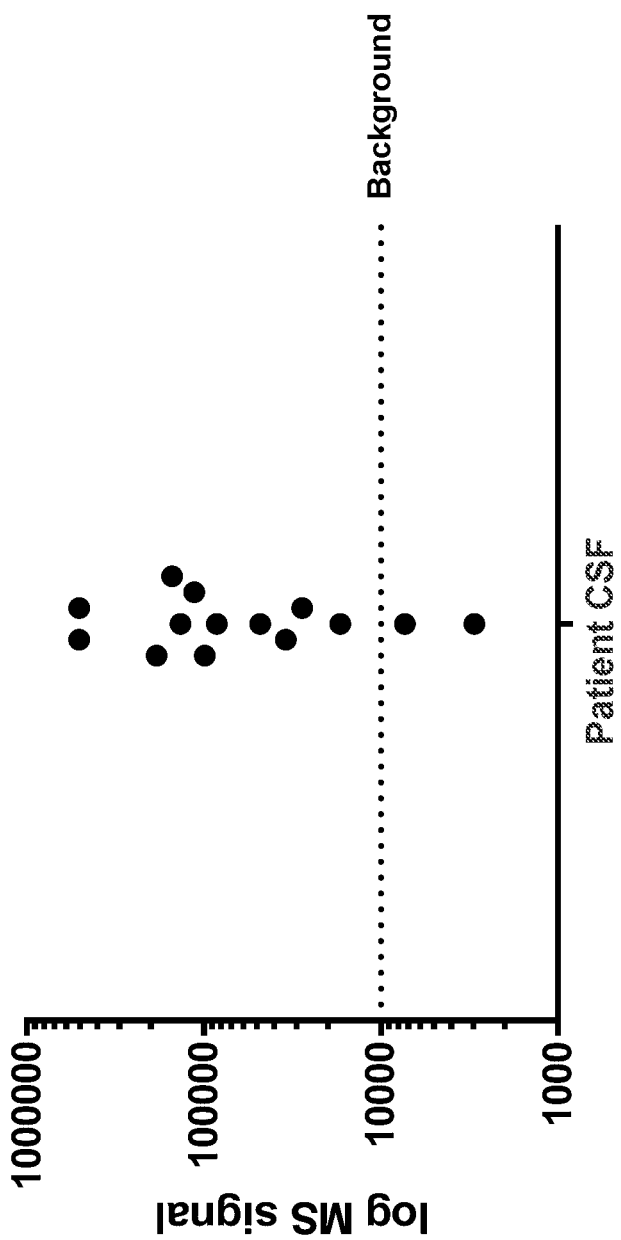
FIG. 4 shows levels of the UBE3A protein detected in CSF samples using Liquid Chromatograph-Mass Spectrometry (LC-MS).
Figure 5:
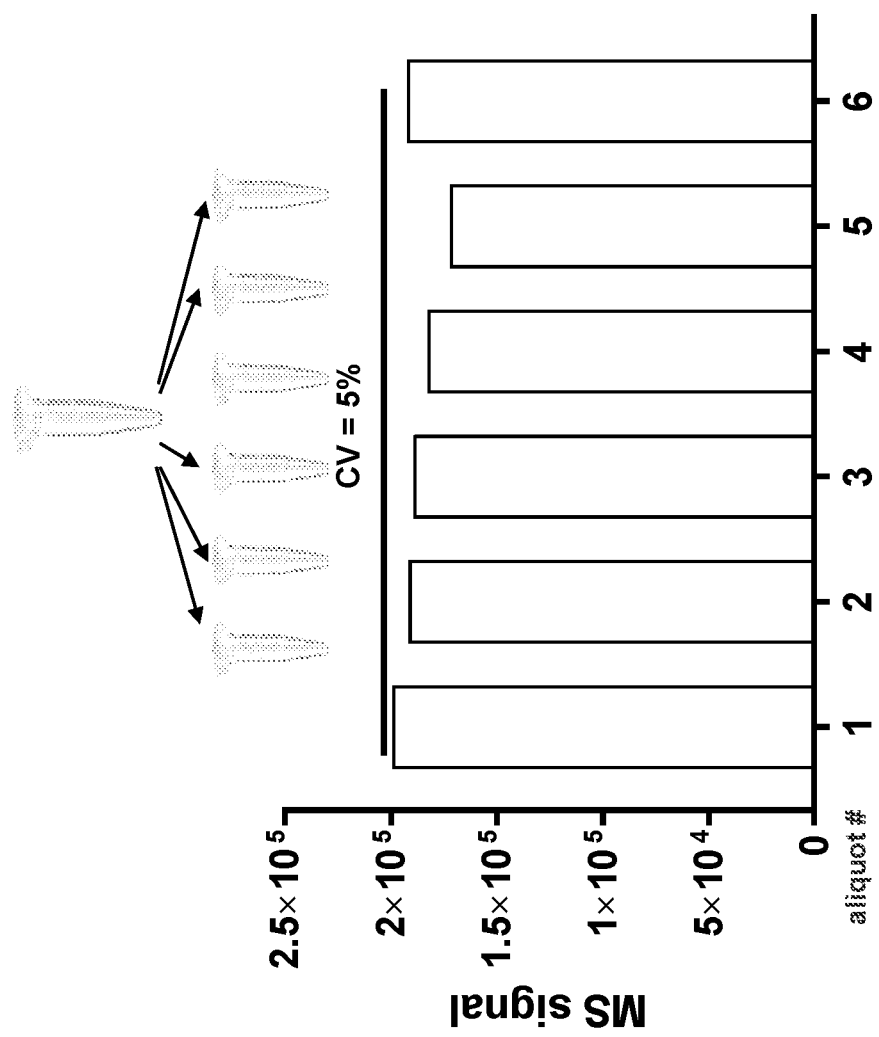
FIG. 5 shows levels of the UBE3A protein detected in aliquots of the same CSF sample using LC-MS.

CSF samples from 14 independent donors were collected and subjected to the above protocol. In 12 out of the 14 samples, UBE3A was detected (FIG. 4). The assay was also highly reproducible. Pooled CSF was split into 6 aliquots of 500 µL each and subjected to the above protocol with 5% CV in 6 replicates ran in parallel (FIG. 5).

Figure 6:
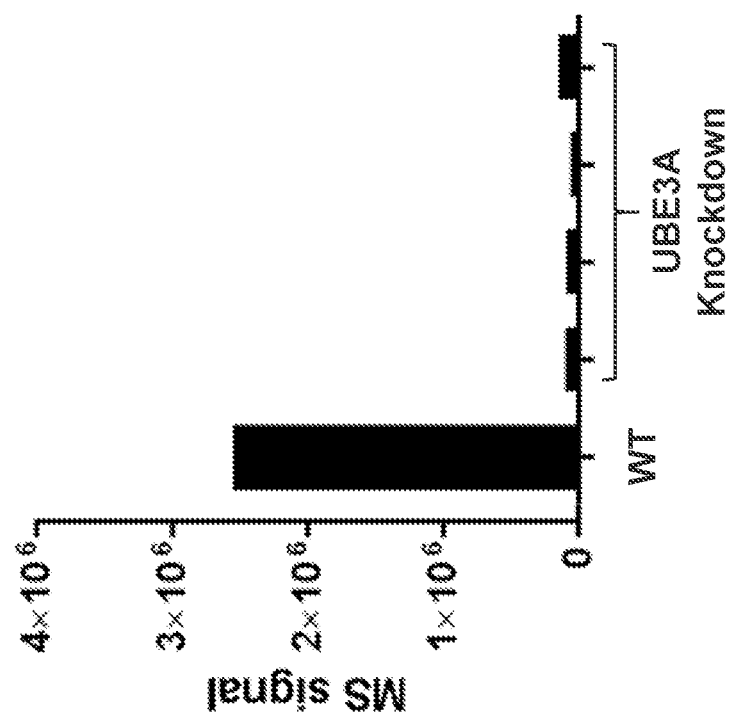
FIG. 6 shows LC-MS based detection of reduced levels of the UBE3A protein in cells treated with UBE3A shRNA as compared to control.

To further evaluate assay specificity, UBE3A in HEK293T cells was knocked down by UBE3A shRNA prior to running the detection assay. Specifically, HEK293T cells were either treated with control shRNA or 1 of 4 UBE3A shRNAs. Cells were lysed and the LC-MS assay described above was performed on these lysates. As shown in FIG. 6, a reduction in the UBE3A signals were observed in cells where UBE3A was knocked down.

Figure 7A:
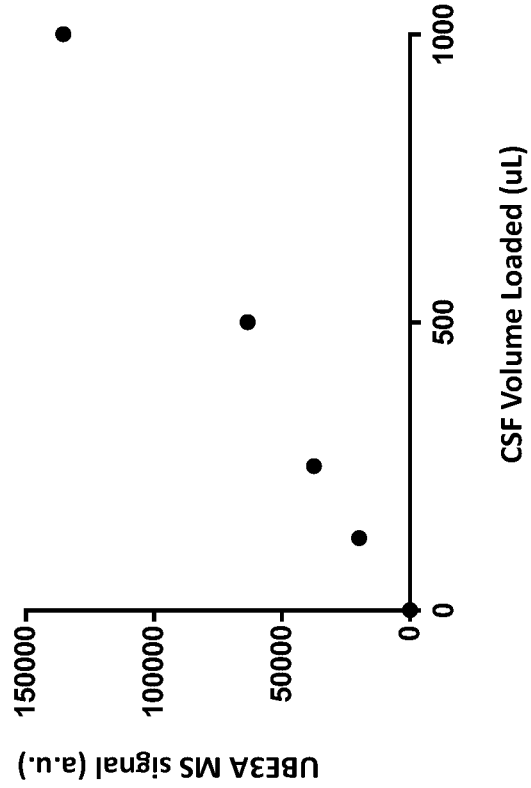
FIGS. 7A and 7B show the correlation between the mass spectrometry signal and the volume of CSF samples analyzed using LC-MS.
Figure 7B:
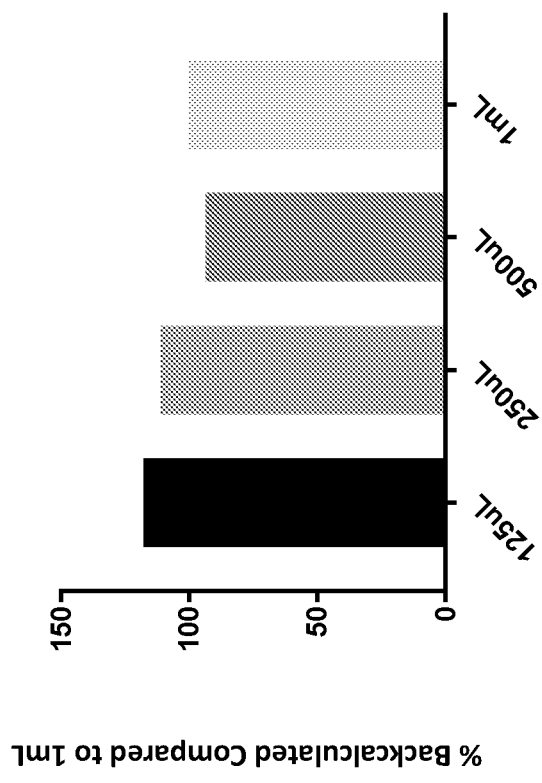

To see if the UBE3A signal detected using the assay correlated with the CSF volume, different volumes of CSF (1 mL, 500 µL, 250 µL, 125 µL, 0 µL) from a single source were tested. As shown in FIGS. 7A and 7B, good parallelism between the mass spectrometry signal and the volume of CSF samples were observed.

These results demonstrate that the LC-MS assay allows specific detection of the UBE3A protein in patient CSF samples. The detection was selective, based on recombinant linearity, endogenous parallelism, and tissue KD.

Other Embodiments

While the invention has been described in conjunction with the detailed description thereof, the foregoing description is intended to illustrate and not limit the scope of the invention, which is defined by the scope of the appended claims. Other aspects, advantages, and modifications are within the scope of the following claims.

---

What is claimed is:

1. A method of detecting the presence or amount of a UBE3A protein in a sample, the method comprising:
   contacting the sample with an antibody that binds to the UBE3A protein;
   removing from the sample some or all of the proteins that are not bound to the antibody, resulting in a purified protein preparation;
   subjecting the purified protein preparation to enzymatic digestion, resulting in a digested peptide preparation; and
   determining via mass spectrometry the presence or amount of one or more UBE3A peptides in the digested peptide preparation, thereby identifying the presence or amount of the UBE3A protein in the sample.

2. The method of claim 1, wherein the one or more UBE3A peptides comprise at least one peptide selected from the peptides depicted in Table 17.

3. The method of claim 1, wherein the one or more UBE3A peptides comprise at least one peptide selected from the group consisting of: VFSSAEALVQSFR (SEQ ID NO:3), NLVNDDDAIVAASK (SEQ ID NO:4), VDPLETELGVK (SEQ ID NO:5), and LEMIAMENPADLKK (SEQ ID NO:6).

4. The method of claim 3, comprising detecting one peptide selected from the group consisting of: VFSSAEALVQSFR (SEQ ID NO:3), NLVNDDDAIVAASK (SEQ ID NO: 4), VDPLETELGVK (SEQ ID NO:5), and LEMIAMENPADLKK (SEQ ID NO:6).

5. The method of claim 3, comprising detecting two or more peptides selected from the group consisting of: VFSSAEALVQSFR (SEQ ID NO:3), NLVNDDDAIVAASK (SEQ ID NO:4), VDPLETELGVK (SEQ ID NO:5), and LEMIAMENPADLKK (SEQ ID NO: 6).

6. The method of claim 3, comprising detecting peptides VFSSAEALVQSFR (SEQ ID NO:3), NLVNDDDAIVAASK (SEQ ID NO:4), VDPLETELGVK (SEQ ID NO:5), and LEMIAMENPADLKK (SEQ ID NO:6).

7. The method of claim 1, further comprising detecting one or more additional UBE3A peptides in the digested peptide preparation.

8. The method of claim 1, wherein enzymatic digestion comprises contacting the purified protein preparation with trypsin.

9. The method of claim 1, wherein the antibody that binds to the UBE3A protein competes with the 3E5 antibody for binding to the UBE3A protein.

10. The method of claim 1, wherein the antibody that binds to the UBE3A protein comprises the 3E5 antibody.

11. The method of claim 1, wherein the antibody that binds to the UBE3A protein is conjugated to beads.

12. The method of claim 1, wherein the sample is a human CSF sample obtained from a human subject with Angelman syndrome or at risk of developing Angelman syndrome.

13. The method of claim 1, wherein identifying the sample as having an undetectable level of the UBE3A protein, a level of the UBE3A protein reduced as compared to healthy subjects, or a level of the UBE3A protein within the range found in subjects with Angelman syndrome identifies a human subject from whom the sample was obtained as having Angelman syndrome or at risk of developing Angelman syndrome.

14. A method of treating a human subject that has Angelman syndrome or is at risk of developing Angelman syndrome, the method comprising:
identifying the human subject as having Angelman syndrome or being at risk of developing Angelman syndrome according to the method of claim 13; and
administering to the human subject a therapeutic.

15. A method for determining if a therapeutic administered to a human subject that has Angelman syndrome or is at risk of developing Angelman syndrome is an efficacious therapeutic, comprising:
administering one or more doses of the therapeutic to the human subject; and
measuring according to the method of claim 1 a UBE3A protein level in a biological sample obtained from the human subject after administering the one or more doses of the therapeutic,
wherein if the UBE3A protein level in the biological sample is higher than the range of UBE3A protein level found in subjects with Angelman syndrome then the therapeutic is identified as being an efficacious therapeutic.

16. A method for determining if a therapeutic administered to a human subject that has Angelman syndrome or is at risk of developing Angelman syndrome is an efficacious therapeutic, comprising:
measuring according to the method of claim 1 a UBE3A protein level in a first biological sample obtained from the human subject;
administering one or more doses of the therapeutic to the human subject; and
measuring according to the method of claim 1 a UBE3A protein level in a second biological sample obtained from the human subject after administering the one or more doses of the therapeutic,
wherein if the UBE3A protein level in the second biological sample is higher than the UBE3A protein level in the first biological sample then the therapeutic is identified as being an efficacious therapeutic.

17. A method of treating a human subject that has Angelman syndrome or is at risk of developing Angelman syndrome, comprising:
administering initial doses of a therapeutic to the human subject, wherein each of the initial doses is in the same amount and is administered at the same dosing interval between doses;
measuring according to the method of claim 1 a UBE3A protein level in a first biological sample obtained from the human subject after administering the initial doses that is higher than (i) a UBE3A protein level measured in a second biological sample obtained from the human subject prior to administering the initial doses, or (ii) the range of UBE3A protein level found in subjects with Angelman syndrome; and
administering further doses of the therapeutic to the human subject, wherein each of the further doses is in the same or lesser amount and at the same or lengthened dosing interval as compared to the initial doses.

18. A method of treating a human subject that has Angelman syndrome or is at risk of developing Angelman syndrome, comprising:
administering initial doses of a therapeutic to the human subject, wherein each of the initial doses is in the same amount and is administered at the same dosing interval between doses;
measuring according to the method of claim 1 a UBE3A protein level in a first biological sample obtained from the human subject after administering the initial doses that is equal to or lower than (i) a UBE3A protein level measured in a second biological sample obtained from the human subject prior to administering the initial doses, or (ii) the range of UBE3A protein level found in subjects with Angelman syndrome; and
administering further doses of the therapeutic to the human subject, wherein each of the further doses is in an increased amount and/or at a shortened dosing interval as compared to the initial doses.

19. The method of claim 14, wherein the therapeutic is an antisense oligonucleotide that reduces the level of UBE3A antisense transcript (UBE3A-ATS).

20. The method of claim 19, wherein the antisense oligonucleotide is administered to the human subject via intrathecal injection.

* * * * *

SEQUENCE LISTING

<160> NUMBER OF SEQ ID NOS: 126

<210> SEQ ID NO 1
<211> LENGTH: 875
<212> TYPE: PRT
<213> ORGANISM: Homo sapiens

<400> SEQUENCE: 1

```
Met Glu Lys Leu His Gln Cys Tyr Trp Lys Ser Gly Glu Pro Gln Ser
1               5                   10                  15

Asp Asp Ile Glu Ala Ser Arg Met Lys Arg Ala Ala Ala Lys His Leu
            20                  25                  30

Ile Glu Arg Tyr Tyr His Gln Leu Thr Glu Gly Cys Gly Asn Glu Ala
        35                  40                  45

Cys Thr Asn Glu Phe Cys Ala Ser Cys Pro Thr Phe Leu Arg Met Asp
    50                  55                  60

Asn Asn Ala Ala Ala Ile Lys Ala Leu Glu Leu Tyr Lys Ile Asn Ala
65                  70                  75                  80

Lys Leu Cys Asp Pro His Pro Ser Lys Lys Gly Ala Ser Ser Ala Tyr
                85                  90                  95

Leu Glu Asn Ser Lys Gly Ala Pro Asn Asn Ser Cys Ser Glu Ile Lys
            100                 105                 110

Met Asn Lys Lys Gly Ala Arg Ile Asp Phe Lys Asp Val Thr Tyr Leu
        115                 120                 125

Thr Glu Glu Lys Val Tyr Glu Ile Leu Glu Leu Cys Arg Glu Arg Glu
    130                 135                 140

Asp Tyr Ser Pro Leu Ile Arg Val Ile Gly Arg Val Phe Ser Ser Ala
145                 150                 155                 160

Glu Ala Leu Val Gln Ser Phe Arg Lys Val Lys Gln His Thr Lys Glu
                165                 170                 175

Glu Leu Lys Ser Leu Gln Ala Lys Asp Glu Asp Lys Asp Glu Asp Glu
            180                 185                 190

Lys Glu Lys Ala Ala Cys Ser Ala Ala Met Glu Glu Asp Ser Glu
        195                 200                 205

Ala Ser Ser Ser Arg Ile Gly Asp Ser Ser Gln Gly Asp Asn Asn Leu
    210                 215                 220

Gln Lys Leu Gly Pro Asp Asp Val Ser Val Asp Ile Asp Ala Ile Arg
225                 230                 235                 240

Arg Val Tyr Thr Arg Leu Leu Ser Asn Glu Lys Ile Glu Thr Ala Phe
                245                 250                 255

Leu Asn Ala Leu Val Tyr Leu Ser Pro Asn Val Glu Cys Asp Leu Thr
            260                 265                 270

Tyr His Asn Val Tyr Ser Arg Asp Pro Asn Tyr Leu Asn Leu Phe Ile
        275                 280                 285
```

-continued

```
Ile Val Met Glu Asn Arg Asn Leu His Ser Pro Glu Tyr Leu Glu Met
    290                 295                 300
Ala Leu Pro Leu Phe Cys Lys Ala Met Ser Lys Leu Pro Leu Ala Ala
305                 310                 315                 320
Gln Gly Lys Leu Ile Arg Leu Trp Ser Lys Tyr Asn Ala Asp Gln Ile
                    325                 330                 335
Arg Arg Met Met Glu Thr Phe Gln Gln Leu Ile Thr Tyr Lys Val Ile
                340                 345                 350
Ser Asn Glu Phe Asn Ser Arg Asn Leu Val Asn Asp Asp Ala Ile
            355                 360                 365
Val Ala Ala Ser Lys Cys Leu Lys Met Val Tyr Tyr Ala Asn Val Val
        370                 375                 380
Gly Glu Val Asp Thr Asn His Asn Glu Glu Asp Asp Glu Glu Pro
385                 390                 395                 400
Ile Pro Glu Ser Ser Glu Leu Thr Leu Gln Glu Leu Leu Gly Glu Glu
                    405                 410                 415
Arg Arg Asn Lys Lys Gly Pro Arg Val Asp Pro Leu Glu Thr Glu Leu
                420                 425                 430
Gly Val Lys Thr Leu Asp Cys Arg Lys Pro Leu Ile Pro Phe Glu Glu
            435                 440                 445
Phe Ile Asn Glu Pro Leu Asn Glu Val Leu Glu Met Asp Lys Asp Tyr
        450                 455                 460
Thr Phe Phe Lys Val Glu Thr Glu Asn Lys Phe Ser Phe Met Thr Cys
465                 470                 475                 480
Pro Phe Ile Leu Asn Ala Val Thr Lys Asn Leu Gly Leu Tyr Tyr Asp
                    485                 490                 495
Asn Arg Ile Arg Met Tyr Ser Glu Arg Ile Thr Val Leu Tyr Ser
                500                 505                 510
Leu Val Gln Gly Gln Gln Leu Asn Pro Tyr Leu Arg Leu Lys Val Arg
            515                 520                 525
Arg Asp His Ile Ile Asp Asp Ala Leu Val Arg Leu Glu Met Ile Ala
        530                 535                 540
Met Glu Asn Pro Ala Asp Leu Lys Lys Gln Leu Tyr Val Glu Phe Glu
545                 550                 555                 560
Gly Glu Gln Gly Val Asp Glu Gly Val Ser Lys Glu Phe Phe Gln
                    565                 570                 575
Leu Val Val Glu Glu Ile Phe Asn Pro Asp Ile Gly Met Phe Thr Tyr
                580                 585                 590
Asp Glu Ser Thr Lys Leu Phe Trp Phe Asn Pro Ser Ser Phe Glu Thr
            595                 600                 605
Glu Gly Gln Phe Thr Leu Ile Gly Ile Val Leu Gly Leu Ala Ile Tyr
        610                 615                 620
Asn Asn Cys Ile Leu Asp Val His Phe Pro Met Val Val Tyr Arg Lys
625                 630                 635                 640
Leu Met Gly Lys Lys Gly Thr Phe Arg Asp Leu Gly Asp Ser His Pro
                    645                 650                 655
Val Leu Tyr Gln Ser Leu Lys Asp Leu Leu Glu Tyr Glu Gly Asn Val
                660                 665                 670
Glu Asp Asp Met Met Ile Thr Phe Gln Ile Ser Gln Thr Asp Leu Phe
            675                 680                 685
Gly Asn Pro Met Met Tyr Asp Leu Lys Glu Asn Gly Asp Lys Ile Pro
        690                 695                 700
```

-continued

```
Ile Thr Asn Glu Asn Arg Lys Glu Phe Val Asn Leu Tyr Ser Asp Tyr
705                 710                 715                 720

Ile Leu Asn Lys Ser Val Glu Lys Gln Phe Lys Ala Phe Arg Arg Gly
            725                 730                 735

Phe His Met Val Thr Asn Glu Ser Pro Leu Lys Tyr Leu Phe Arg Pro
            740                 745                 750

Glu Glu Ile Glu Leu Leu Ile Cys Gly Ser Arg Asn Leu Asp Phe Gln
            755                 760                 765

Ala Leu Glu Glu Thr Thr Glu Tyr Asp Gly Gly Tyr Thr Arg Asp Ser
        770                 775                 780

Val Leu Ile Arg Glu Phe Trp Glu Ile Val His Ser Phe Thr Asp Glu
785                 790                 795                 800

Gln Lys Arg Leu Phe Leu Gln Phe Thr Thr Gly Thr Asp Arg Ala Pro
                805                 810                 815

Val Gly Gly Leu Gly Lys Leu Lys Met Ile Ile Ala Lys Asn Gly Pro
            820                 825                 830

Asp Thr Glu Arg Leu Pro Thr Ser His Thr Cys Phe Asn Val Leu Leu
            835                 840                 845

Leu Pro Glu Tyr Ser Ser Lys Glu Lys Leu Lys Glu Arg Leu Leu Lys
850                 855                 860

Ala Ile Thr Tyr Ala Lys Gly Phe Gly Met Leu
865                 870                 875

<210> SEQ ID NO 2
<211> LENGTH: 100
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 2

Glu Thr Phe Gln Gln Leu Ile Thr Tyr Lys Val Ile Ser Asn Glu Phe
1               5                   10                  15

Asn Ser Arg Asn Leu Val Asn Asp Asp Ala Ile Val Ala Ala Ser
            20                  25                  30

Lys Cys Leu Lys Met Val Tyr Tyr Ala Asn Val Val Gly Gly Glu Val
            35                  40                  45

Asp Thr Asn His Asn Glu Glu Asp Asp Glu Pro Ile Pro Glu Ser
        50                  55                  60

Ser Glu Leu Thr Leu Gln Glu Leu Leu Gly Glu Glu Arg Arg Asn Lys
65                  70                  75                  80

Lys Gly Pro Arg Val Asp Pro Leu Glu Thr Glu Leu Gly Val Lys Thr
                85                  90                  95

Leu Asp Cys Arg
            100

<210> SEQ ID NO 3
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Val Phe Ser Ser Ala Glu Ala Leu Val Gln Ser Phe Arg
1               5                   10
```

<210> SEQ ID NO 4
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Asn Leu Val Asn Asp Asp Ala Ile Val Ala Ala Ser Lys
1               5                   10

<210> SEQ ID NO 5
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Val Asp Pro Leu Glu Thr Glu Leu Gly Val Lys
1               5                   10

<210> SEQ ID NO 6
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Leu Glu Met Ile Ala Met Glu Asn Pro Ala Asp Leu Lys Lys
1               5                   10

<210> SEQ ID NO 7
<211> LENGTH: 28
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Lys Pro Leu Ile Pro Phe Glu Glu Phe Ile Asn Glu Pro Leu Asn Glu
1               5                   10                  15

Val Leu Glu Met Asp Lys Asp Tyr Thr Phe Phe Lys
            20                  25

<210> SEQ ID NO 8
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Leu Glu Met Ile Ala Met Glu Asn Pro Ala Asp Leu Lys Lys
1               5                   10

<210> SEQ ID NO 9
<211> LENGTH: 14
<212> TYPE: PRT
<213> ORGANISM: Artificial Sequence
<220> FEATURE:

```
<223> OTHER INFORMATION: Description of Artificial Sequence: Synthetic
      peptide

<400> SEQUENCE: 9

Asn Leu Val Asn Asp Asp Ala Ile Val Ala Ala Ser Lys
1               5                   10

<210> SEQ ID NO 10
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Asp His Ile Ile Asp Asp Ala Leu Val Arg
1               5                   10

<210> SEQ ID NO 11
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Val Phe Ser Ser Ala Glu Ala Leu Val Gln Ser Phe Arg
1               5                   10

<210> SEQ ID NO 12
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Met Met Glu Thr Phe Gln Gln Leu Ile Thr Tyr Lys
1               5                   10

<210> SEQ ID NO 13
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Val Asp Pro Leu Glu Thr Glu Leu Gly Val Lys
1               5                   10

<210> SEQ ID NO 14
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Leu Gly Pro Asp Asp Val Ser Val Asp Ile Asp Ala Ile Arg
1               5                   10
```

```
<210> SEQ ID NO 15
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Glu Phe Val Asn Leu Tyr Ser Asp Tyr Ile Leu Asn Lys
1               5                   10

<210> SEQ ID NO 16
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Asp Val Thr Tyr Leu Thr Glu Glu Lys
1               5

<210> SEQ ID NO 17
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

Asn Leu Asp Phe Gln Ala Leu Glu Glu Thr Thr Glu Tyr Asp Gly Gly
1               5                   10                  15

Tyr Thr Arg

<210> SEQ ID NO 18
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Glu Arg Glu Asp Tyr Ser Pro Leu Ile Arg
1               5                   10

<210> SEQ ID NO 19
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Asn Leu Gly Leu Tyr Tyr Asp Asn Arg
1               5

<210> SEQ ID NO 20
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
```

<400> SEQUENCE: 20

Gly Phe His Met Val Thr Asn Glu Ser Pro Leu Lys
1               5                  10

<210> SEQ ID NO 21
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Asp Leu Gly Asp Ser His Pro Val Leu Tyr Gln Ser Leu Lys
1               5                  10

<210> SEQ ID NO 22
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22

Leu Glu Met Ile Ala Met Glu Asn Pro Ala Asp Leu Lys
1               5                  10

<210> SEQ ID NO 23
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

Leu Phe Leu Gln Phe Thr Thr Gly Thr Asp Arg
1               5                  10

<210> SEQ ID NO 24
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

Glu Phe Trp Glu Ile Val His Ser Phe Thr Asp Glu Gln Lys Arg
1               5                  10                  15

<210> SEQ ID NO 25
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Gly Phe Gly Met Leu
1               5

<210> SEQ ID NO 26
<211> LENGTH: 13

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

Arg Gly Phe His Met Val Thr Asn Glu Ser Pro Leu Lys
1               5                   10

<210> SEQ ID NO 27
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 27

Glu Phe Trp Glu Ile Val His Ser Phe Thr Asp Glu Gln Lys
1               5                   10

<210> SEQ ID NO 28
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

Leu Gly Pro Asp Asp Val Ser Val Asp Ile Asp Ala Ile Arg Arg
1               5                   10                  15

<210> SEQ ID NO 29
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Asp Pro Asn Tyr Leu Asn Leu Phe Ile Ile Val Met Glu Asn Arg
1               5                   10                  15

<210> SEQ ID NO 30
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 30

Arg Asp His Ile Ile Asp Asp Ala Leu Val Arg
1               5                   10

<210> SEQ ID NO 31
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 31

Lys Pro Leu Ile Pro Phe Glu Glu Phe Ile Asn Glu Pro Leu Asn Glu
```

```
                   1               5                  10                 15
Val Leu Glu Met Asp Lys
                20

<210> SEQ ID NO 32
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 32

Gln Leu Tyr Val Glu Phe Glu Gly Glu Gln Gly Val Asp Glu Gly Gly
1               5                  10                 15

Val Ser Lys

<210> SEQ ID NO 33
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 33

Glu Asn Gly Asp Lys Ile Pro Ile Thr Asn Glu Asn Arg
1               5                  10

<210> SEQ ID NO 34
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 34

Glu Asp Tyr Ser Pro Leu Ile Arg
1               5

<210> SEQ ID NO 35
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 35

Leu Phe Leu Gln Phe Thr Thr Gly Thr Asp Arg Ala Pro Val Gly Gly
1               5                  10                 15

Leu Gly Lys

<210> SEQ ID NO 36
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 36

Glu Phe Phe Gln Leu Val Val Glu Glu Ile Phe Asn Pro Asp Ile Gly
1               5                  10                 15
```

```
Met Phe Thr Tyr Asp Glu Ser Thr Lys
            20                  25
```

<210> SEQ ID NO 37
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (4)..(4)
<223> OTHER INFORMATION: Oxidated residue

<400> SEQUENCE: 37

```
Gly Phe Gly Met Leu
1               5
```

<210> SEQ ID NO 38
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 38

```
Val Ile Ser Asn Glu Phe Asn Ser Arg
1               5
```

<210> SEQ ID NO 39
<211> LENGTH: 34
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 39

```
Asp Leu Leu Glu Tyr Glu Gly Asn Val Glu Asp Asp Met Met Ile Thr
1               5                   10                  15

Phe Gln Ile Ser Gln Thr Asp Leu Phe Gly Asn Pro Met Met Tyr Asp
            20                  25                  30

Leu Lys
```

<210> SEQ ID NO 40
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 40

```
Arg Met Met Glu Thr Phe Gln Gln Leu Ile Thr Tyr Lys
1               5                   10
```

<210> SEQ ID NO 41
<211> LENGTH: 34
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 41

```
Lys Pro Leu Ile Pro Phe Glu Glu Phe Ile Asn Glu Pro Leu Asn Glu
1               5                   10                  15

Val Leu Glu Met Asp Lys Asp Tyr Thr Phe Phe Lys Val Glu Thr Glu
            20                  25                  30

Asn Lys
```

<210> SEQ ID NO 42
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 42

```
Arg Leu Phe Leu Gln Phe Thr Thr Gly Thr Asp Arg
1               5                   10
```

<210> SEQ ID NO 43
<211> LENGTH: 28
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (11)..(11)
<223> OTHER INFORMATION: Deamidated residue
<220> FEATURE:
<221> NAME/KEY: MOD_RES
<222> LOCATION: (15)..(15)
<223> OTHER INFORMATION: Deamidated residue

<400> SEQUENCE: 43

```
Lys Pro Leu Ile Pro Phe Glu Glu Phe Ile Asn Glu Pro Leu Asn Glu
1               5                   10                  15

Val Leu Glu Met Asp Lys Asp Tyr Thr Phe Phe Lys
            20                  25
```

<210> SEQ ID NO 44
<211> LENGTH: 28
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (20)..(20)
<223> OTHER INFORMATION: Oxidated residue

<400> SEQUENCE: 44

```
Lys Pro Leu Ile Pro Phe Glu Glu Phe Ile Asn Glu Pro Leu Asn Glu
1               5                   10                  15

Val Leu Glu Met Asp Lys Asp Tyr Thr Phe Phe Lys
            20                  25
```

<210> SEQ ID NO 45
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 45

```
Asp Tyr Thr Phe Phe Lys
1               5
```

<210> SEQ ID NO 46
<211> LENGTH: 41
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (17)..(17)
<223> OTHER INFORMATION: Deamidated residue
<220> FEATURE:
<221> NAME/KEY: MOD_RES
<222> LOCATION: (34)..(34)
<223> OTHER INFORMATION: Deamidated residue

<400> SEQUENCE: 46

```
Met Val Tyr Tyr Ala Asn Val Val Gly Gly Glu Val Asp Thr Asn His
1               5                   10                  15

Asn Glu Glu Asp Asp Glu Glu Pro Ile Pro Glu Ser Ser Glu Leu Thr
            20                  25                  30

Leu Gln Glu Leu Leu Gly Glu Glu Arg
        35                  40
```

<210> SEQ ID NO 47
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 47

```
Ile Thr Val Leu Tyr Ser Leu Val Gln Gly Gln Gln Leu Asn Pro Tyr
1               5                   10                  15

Leu Arg
```

<210> SEQ ID NO 48
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 48

```
Val Phe Ser Ser Ala Glu Ala Leu Val Gln Ser Phe Arg
1               5                   10
```

<210> SEQ ID NO 49
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 49

```
Lys Gln Leu Tyr Val Glu Phe Glu Gly Glu Gln Gly Val Asp Glu Gly
1               5                   10                  15

Gly Val Ser Lys
            20
```

```
<210> SEQ ID NO 50
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 50

Glu Phe Val Asn Leu Tyr Ser Asp Tyr Ile Leu Asn Lys
1               5                   10

<210> SEQ ID NO 51
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 51

Ala Met Ser Lys Leu Pro Leu Ala Ala Gln Gly Lys
1               5                   10

<210> SEQ ID NO 52
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 52

Asp His Ile Ile Asp Asp Ala Leu Val Arg
1               5                   10

<210> SEQ ID NO 53
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 53

Lys Glu Phe Val Asn Leu Tyr Ser Asp Tyr Ile Leu Asn Lys
1               5                   10

<210> SEQ ID NO 54
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (6)..(6)
<223> OTHER INFORMATION: Oxidated residue

<400> SEQUENCE: 54

Leu Glu Met Ile Ala Met Glu Asn Pro Ala Asp Leu Lys Lys
1               5                   10

<210> SEQ ID NO 55
<211> LENGTH: 13
<212> TYPE: PRT
<213> ORGANISM: Artificial Sequence
<220> FEATURE:
```

```
<223> OTHER INFORMATION: Description of Artificial Sequence: Synthetic
      peptide
<220> FEATURE:
<221> NAME/KEY: MOD_RES
<222> LOCATION: (2)..(2)
<223> OTHER INFORMATION: Deamidated residue

<400> SEQUENCE: 55

Glu Asn Gly Asp Lys Ile Pro Ile Thr Asn Glu Asn Arg
1               5                   10

<210> SEQ ID NO 56
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 56

Glu Phe Trp Glu Ile Val His Ser Phe Thr Asp Glu Gln Lys Arg
1               5                   10                  15

<210> SEQ ID NO 57
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 57

Glu Arg Glu Asp Tyr Ser Pro Leu Ile Arg
1               5                   10

<210> SEQ ID NO 58
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 58

Leu Phe Leu Gln Phe Thr Thr Gly Thr Asp Arg
1               5                   10

<210> SEQ ID NO 59
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 59

Asp Ser Val Leu Ile Arg
1               5

<210> SEQ ID NO 60
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(2)
```

<223> OTHER INFORMATION: Oxidated residue

<400> SEQUENCE: 60

Met Met Glu Thr Phe Gln Gln Leu Ile Thr Tyr Lys
1               5                   10

<210> SEQ ID NO 61
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 61

Met Met Glu Thr Phe Gln Gln Leu Ile Thr Tyr Lys
1               5                   10

<210> SEQ ID NO 62
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (4)..(4)
<223> OTHER INFORMATION: Oxidated residue

<400> SEQUENCE: 62

Gly Phe His Met Val Thr Asn Glu Ser Pro Leu Lys
1               5                   10

<210> SEQ ID NO 63
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (5)..(5)
<223> OTHER INFORMATION: Deamidated residue

<400> SEQUENCE: 63

Asn Leu Asp Phe Gln Ala Leu Glu Glu Thr Thr Glu Tyr Asp Gly Gly
1               5                   10                  15

Tyr Thr Arg

<210> SEQ ID NO 64
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(2)
<223> OTHER INFORMATION: Deamidated residue

<400> SEQUENCE: 64

Glu Asn Gly Asp Lys Ile Pro Ile Thr Asn Glu Asn Arg Lys
1               5                   10

<210> SEQ ID NO 65

```
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 65

Ser Gly Glu Pro Gln Ser Asp Asp Ile Glu Ala Ser Arg
1               5                   10

<210> SEQ ID NO 66
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: Deamidated residue

<400> SEQUENCE: 66

Asn Leu Val Asn Asp Asp Asp Ala Ile Val Ala Ala Ser Lys
1               5                   10

<210> SEQ ID NO 67
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (7)..(7)
<223> OTHER INFORMATION: Deamidated residue

<400> SEQUENCE: 67

Gly Phe His Met Val Thr Asn Glu Ser Pro Leu Lys
1               5                   10

<210> SEQ ID NO 68
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (5)..(5)
<223> OTHER INFORMATION: Oxidated residue

<400> SEQUENCE: 68

Arg Gly Phe His Met Val Thr Asn Glu Ser Pro Leu Lys
1               5                   10

<210> SEQ ID NO 69
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 69

Arg Leu Phe Leu Gln Phe Thr Thr Gly Thr Asp Arg Ala Pro Val Gly
1               5                   10                  15
```

```
Gly Leu Gly Lys
            20

<210> SEQ ID NO 70
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 70

Glu Asn Gly Asp Lys Ile Pro Ile Thr Asn Glu Asn Arg Lys
1               5                   10

<210> SEQ ID NO 71
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (10)..(10)
<223> OTHER INFORMATION: Deamidated residue

<400> SEQUENCE: 71

Glu Asn Gly Asp Lys Ile Pro Ile Thr Asn Glu Asn Arg Lys
1               5                   10

<210> SEQ ID NO 72
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 72

Ala Leu Glu Leu Tyr Lys
1               5

<210> SEQ ID NO 73
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 73

Glu Asn Gly Asp Lys Ile Pro Ile Thr Asn Glu Asn Arg
1               5                   10

<210> SEQ ID NO 74
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 74

Arg Asp His Ile Ile Asp Asp Ala Leu Val Arg
1               5                   10
```

```
<210> SEQ ID NO 75
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 75

Ser Gly Glu Pro Gln Ser Asp Asp Ile Glu Ala Ser Arg
1               5                   10

<210> SEQ ID NO 76
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (3)..(3)
<223> OTHER INFORMATION: Oxidated residue
<220> FEATURE:
<221> NAME/KEY: MOD_RES
<222> LOCATION: (6)..(6)
<223> OTHER INFORMATION: Oxidated residue

<400> SEQUENCE: 76

Leu Glu Met Ile Ala Met Glu Asn Pro Ala Asp Leu Lys Lys
1               5                   10

<210> SEQ ID NO 77
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 77

Asn Leu Gly Leu Tyr Tyr Asp Asn Arg
1               5

<210> SEQ ID NO 78
<211> LENGTH: 41
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (1)..(1)
<223> OTHER INFORMATION: Oxidated residue
<220> FEATURE:
<221> NAME/KEY: MOD_RES
<222> LOCATION: (6)..(6)
<223> OTHER INFORMATION: Deamidated residue

<400> SEQUENCE: 78

Met Val Tyr Tyr Ala Asn Val Val Gly Gly Glu Val Asp Thr Asn His
1               5                   10                  15

Asn Glu Glu Asp Asp Glu Glu Pro Ile Pro Glu Ser Ser Glu Leu Thr
                20                  25                  30

Leu Gln Glu Leu Leu Gly Glu Glu Arg
        35                  40

<210> SEQ ID NO 79
```

```
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (11)..(11)
<223> OTHER INFORMATION: Deamidated residue

<400> SEQUENCE: 79

Lys Gln Leu Tyr Val Glu Phe Glu Gly Glu Gln Gly Val Asp Glu Gly
1               5                   10                  15

Gly Val Ser Lys
            20

<210> SEQ ID NO 80
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 80

Leu Glu Met Ile Ala Met Glu Asn Pro Ala Asp Leu Lys Lys
1               5                   10

<210> SEQ ID NO 81
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 81

Asp Leu Gly Asp Ser His Pro Val Leu Tyr Gln Ser Leu Lys
1               5                   10

<210> SEQ ID NO 82
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (12)..(12)
<223> OTHER INFORMATION: Deamidated residue
<220> FEATURE:
<221> NAME/KEY: MOD_RES
<222> LOCATION: (17)..(17)
<223> OTHER INFORMATION: Oxidated residue

<400> SEQUENCE: 82

Glu Phe Phe Gln Leu Val Val Glu Glu Ile Phe Asn Pro Asp Ile Gly
1               5                   10                  15

Met Phe Thr Tyr Asp Glu Ser Thr Lys
            20                  25

<210> SEQ ID NO 83
<211> LENGTH: 41
<212> TYPE: PRT
<213> ORGANISM: Artificial Sequence
<220> FEATURE:
<223> OTHER INFORMATION: Description of Artificial Sequence: Synthetic
```

```
              polypeptide
<220> FEATURE:
<221> NAME/KEY: MOD_RES
<222> LOCATION: (6)..(6)
<223> OTHER INFORMATION: Deamidated residue
<220> FEATURE:
<221> NAME/KEY: MOD_RES
<222> LOCATION: (15)..(15)
<223> OTHER INFORMATION: Deamidated residue
<220> FEATURE:
<221> NAME/KEY: MOD_RES
<222> LOCATION: (17)..(17)
<223> OTHER INFORMATION: Deamidated residue

<400> SEQUENCE: 83

Met Val Tyr Tyr Ala Asn Val Val Gly Gly Glu Val Asp Thr Asn His
1               5                   10                  15

Asn Glu Glu Asp Asp Glu Glu Pro Ile Pro Glu Ser Ser Glu Leu Thr
            20                  25                  30

Leu Gln Glu Leu Leu Gly Glu Glu Arg
        35                  40

<210> SEQ ID NO 84
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (12)..(12)
<223> OTHER INFORMATION: Deamidated residue
<220> FEATURE:
<221> NAME/KEY: MOD_RES
<222> LOCATION: (17)..(17)
<223> OTHER INFORMATION: Oxidated residue

<400> SEQUENCE: 84

Glu Phe Phe Gln Leu Val Val Glu Glu Ile Phe Asn Pro Asp Ile Gly
1               5                   10                  15

Met Phe Thr Tyr Asp Glu Ser Thr Lys
            20                  25

<210> SEQ ID NO 85
<211> LENGTH: 34
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (18)..(18)
<223> OTHER INFORMATION: Deamidated residue
<220> FEATURE:
<221> NAME/KEY: MOD_RES
<222> LOCATION: (21)..(21)
<223> OTHER INFORMATION: Deamidated residue

<400> SEQUENCE: 85

Asp Leu Leu Glu Tyr Glu Gly Asn Val Glu Asp Asp Met Met Ile Thr
1               5                   10                  15

Phe Gln Ile Ser Gln Thr Asp Leu Phe Gly Asn Pro Met Met Tyr Asp
            20                  25                  30

Leu Lys

<210> SEQ ID NO 86
```

<211> LENGTH: 34
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (18)..(18)
<223> OTHER INFORMATION: Deamidated residue

<400> SEQUENCE: 86

Asp Leu Leu Glu Tyr Glu Gly Asn Val Glu Asp Asp Met Met Ile Thr
1               5                   10                  15

Phe Gln Ile Ser Gln Thr Asp Leu Phe Gly Asn Pro Met Met Tyr Asp
            20                  25                  30

Leu Lys

<210> SEQ ID NO 87
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (12)..(12)
<223> OTHER INFORMATION: Deamidated residue

<400> SEQUENCE: 87

Glu Phe Phe Gln Leu Val Val Glu Glu Ile Phe Asn Pro Asp Ile Gly
1               5                   10                  15

Met Phe Thr Tyr Asp Glu Ser Thr Lys
            20                  25

<210> SEQ ID NO 88
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 88

Val Ile Ser Asn Glu Phe Asn Ser Arg
1               5

<210> SEQ ID NO 89
<211> LENGTH: 34
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (14)..(14)
<223> OTHER INFORMATION: Oxidated residue
<220> FEATURE:
<221> NAME/KEY: MOD_RES
<222> LOCATION: (18)..(18)
<223> OTHER INFORMATION: Deamidated residue

<400> SEQUENCE: 89

Asp Leu Leu Glu Tyr Glu Gly Asn Val Glu Asp Asp Met Met Ile Thr
1               5                   10                  15

Phe Gln Ile Ser Gln Thr Asp Leu Phe Gly Asn Pro Met Met Tyr Asp

Leu Lys

<210> SEQ ID NO 90
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 90

Asp Val Thr Tyr Leu Thr Glu Glu Lys
1               5

<210> SEQ ID NO 91
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (4)..(4)
<223> OTHER INFORMATION: Deamidated residue

<400> SEQUENCE: 91

Glu Phe Val Asn Leu Tyr Ser Asp Tyr Ile Leu Asn Lys
1               5                   10

<210> SEQ ID NO 92
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 92

Gly Phe Gly Met Leu
1               5

<210> SEQ ID NO 93
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: Deamidated residue

<400> SEQUENCE: 93

Gln Leu Tyr Val Glu Phe Glu Gly Glu Gln Gly Val Asp Glu Gly Gly
1               5                   10                  15

Val Ser Lys

<210> SEQ ID NO 94
<211> LENGTH: 28
<212> TYPE: PRT
<213> ORGANISM: Artificial Sequence
<220> FEATURE:
<223> OTHER INFORMATION: Description of Artificial Sequence: Synthetic
      peptide
<220> FEATURE:

```
<221> NAME/KEY: MOD_RES
<222> LOCATION: (11)..(11)
<223> OTHER INFORMATION: Deamidated residue

<400> SEQUENCE: 94

Lys Pro Leu Ile Pro Phe Glu Glu Phe Ile Asn Glu Pro Leu Asn Glu
1               5                   10                  15

Val Leu Glu Met Asp Lys Asp Tyr Thr Phe Phe Lys
            20                  25

<210> SEQ ID NO 95
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (4)..(4)
<223> OTHER INFORMATION: Deamidated residue
<220> FEATURE:
<221> NAME/KEY: MOD_RES
<222> LOCATION: (12)..(12)
<223> OTHER INFORMATION: Deamidated residue

<400> SEQUENCE: 95

Glu Phe Phe Gln Leu Val Val Glu Glu Ile Phe Asn Pro Asp Ile Gly
1               5                   10                  15

Met Phe Thr Tyr Asp Glu Ser Thr Lys
            20                  25

<210> SEQ ID NO 96
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (4)..(4)
<223> OTHER INFORMATION: Deamidated residue

<400> SEQUENCE: 96

Val Ile Ser Asn Glu Phe Asn Ser Arg
1               5

<210> SEQ ID NO 97
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (12)..(12)
<223> OTHER INFORMATION: Deamidated residue

<400> SEQUENCE: 97

Glu Phe Phe Gln Leu Val Val Glu Glu Ile Phe Asn Pro Asp Ile Gly
1               5                   10                  15

Met Phe Thr Tyr Asp Glu Ser Thr Lys
            20                  25

<210> SEQ ID NO 98
<211> LENGTH: 8
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 98

Glu Asp Tyr Ser Pro Leu Ile Arg
1               5

<210> SEQ ID NO 99
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(2)
<223> OTHER INFORMATION: Deamidated residue

<400> SEQUENCE: 99

Glu Asn Gly Asp Lys Ile Pro Ile Thr Asn Glu Asn Arg
1               5                   10

<210> SEQ ID NO 100
<211> LENGTH: 34
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (14)..(14)
<223> OTHER INFORMATION: Oxidated residue
<220> FEATURE:
<221> NAME/KEY: MOD_RES
<222> LOCATION: (18)..(18)
<223> OTHER INFORMATION: Deamidated residue
<220> FEATURE:
<221> NAME/KEY: MOD_RES
<222> LOCATION: (21)..(21)
<223> OTHER INFORMATION: Deamidated residue
<220> FEATURE:
<221> NAME/KEY: MOD_RES
<222> LOCATION: (27)..(27)
<223> OTHER INFORMATION: Deamidated residue

<400> SEQUENCE: 100

Asp Leu Leu Glu Tyr Glu Gly Asn Val Glu Asp Asp Met Met Ile Thr
1               5                   10                  15

Phe Gln Ile Ser Gln Thr Asp Leu Phe Gly Asn Pro Met Met Tyr Asp
            20                  25                  30

Leu Lys

<210> SEQ ID NO 101
<211> LENGTH: 41
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (1)..(1)
<223> OTHER INFORMATION: Oxidated residue
<220> FEATURE:
<221> NAME/KEY: MOD_RES
<222> LOCATION: (15)..(15)
```

```
<223> OTHER INFORMATION: Deamidated residue
<220> FEATURE:
<221> NAME/KEY: MOD_RES
<222> LOCATION: (17)..(17)
<223> OTHER INFORMATION: Deamidated residue

<400> SEQUENCE: 101

Met Val Tyr Tyr Ala Asn Val Val Gly Gly Glu Val Asp Thr Asn His
1               5                   10                  15

Asn Glu Glu Asp Asp Glu Glu Pro Ile Pro Glu Ser Ser Glu Leu Thr
            20                  25                  30

Leu Gln Glu Leu Leu Gly Glu Glu Arg
        35                  40

<210> SEQ ID NO 102
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (5)..(5)
<223> OTHER INFORMATION: Oxidated residue
<220> FEATURE:
<221> NAME/KEY: MOD_RES
<222> LOCATION: (8)..(8)
<223> OTHER INFORMATION: Deamidated residue

<400> SEQUENCE: 102

Arg Gly Phe His Met Val Thr Asn Glu Ser Pro Leu Lys
1               5                   10

<210> SEQ ID NO 103
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 103

Glu Asn Gly Asp Lys Ile Pro Ile Thr Asn Glu Asn Arg Lys
1               5                   10

<210> SEQ ID NO 104
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 104

His Leu Ile Glu Arg
1               5

<210> SEQ ID NO 105
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 105

Ile Gly Asp Ser Ser Gln Gly Asp Asn Asn Leu Gln Lys
```

```
<210> SEQ ID NO 106
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 106

Tyr Asn Ala Asp Gln Ile Arg
1               5

<210> SEQ ID NO 107
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 107

Asn Gly Pro Asp Thr Glu Arg
1               5

<210> SEQ ID NO 108
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 108

Met Tyr Ser Glu Arg
1               5

<210> SEQ ID NO 109
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 109

Lys Gly Thr Phe Arg
1               5

<210> SEQ ID NO 110
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (17)..(17)
<223> OTHER INFORMATION: Oxidated residue

<400> SEQUENCE: 110

Glu Phe Phe Gln Leu Val Val Glu Glu Ile Phe Asn Pro Asp Ile Gly
1               5                   10                  15
Met Phe Thr Tyr Asp Glu Ser Thr Lys
            20                  25
```

<210> SEQ ID NO 111
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (11)..(11)
<223> OTHER INFORMATION: Deamidated residue

<400> SEQUENCE: 111

Lys Pro Leu Ile Pro Phe Glu Glu Phe Ile Asn Glu Pro Leu Asn Glu
1               5                   10                  15

Val Leu Glu Met Asp Lys
            20

<210> SEQ ID NO 112
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (6)..(6)
<223> OTHER INFORMATION: Deamidated residue

<400> SEQUENCE: 112

Asp Pro Asn Tyr Leu Asn Leu Phe Ile Ile Val Met Glu Asn Arg
1               5                   10                  15

<210> SEQ ID NO 113
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 113

Glu Phe Trp Glu Ile Val His Ser Phe Thr Asp Glu Gln Lys
1               5                   10

<210> SEQ ID NO 114
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (10)..(10)
<223> OTHER INFORMATION: Deamidated residue

<400> SEQUENCE: 114

Val Phe Ser Ser Ala Glu Ala Leu Val Gln Ser Phe Arg
1               5                   10

<210> SEQ ID NO 115
<211> LENGTH: 28
<212> TYPE: PRT
<213> ORGANISM: Artificial Sequence
<220> FEATURE:
<223> OTHER INFORMATION: Description of Artificial Sequence: Synthetic
      peptide

```
<220> FEATURE:
<221> NAME/KEY: MOD_RES
<222> LOCATION: (11)..(11)
<223> OTHER INFORMATION: Deamidated residue
<220> FEATURE:
<221> NAME/KEY: MOD_RES
<222> LOCATION: (20)..(20)
<223> OTHER INFORMATION: Oxidated residue

<400> SEQUENCE: 115

Lys Pro Leu Ile Pro Phe Glu Glu Phe Ile Asn Glu Pro Leu Asn Glu
1               5                   10                  15

Val Leu Glu Met Asp Lys Asp Tyr Thr Phe Phe Lys
            20                  25

<210> SEQ ID NO 116
<211> LENGTH: 34
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (18)..(18)
<223> OTHER INFORMATION: Deamidated residue
<220> FEATURE:
<221> NAME/KEY: MOD_RES
<222> LOCATION: (21)..(21)
<223> OTHER INFORMATION: Deamidated residue
<220> FEATURE:
<221> NAME/KEY: MOD_RES
<222> LOCATION: (27)..(27)
<223> OTHER INFORMATION: Deamidated residue

<400> SEQUENCE: 116

Asp Leu Leu Glu Tyr Glu Gly Asn Val Glu Asp Asp Met Met Ile Thr
1               5                   10                  15

Phe Gln Ile Ser Gln Thr Asp Leu Phe Gly Asn Pro Met Met Tyr Asp
            20                  25                  30

Leu Lys

<210> SEQ ID NO 117
<211> LENGTH: 41
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (1)..(1)
<223> OTHER INFORMATION: Oxidated residue
<220> FEATURE:
<221> NAME/KEY: MOD_RES
<222> LOCATION: (6)..(6)
<223> OTHER INFORMATION: Deamidated residue
<220> FEATURE:
<221> NAME/KEY: MOD_RES
<222> LOCATION: (15)..(15)
<223> OTHER INFORMATION: Deamidated residue
<220> FEATURE:
<221> NAME/KEY: MOD_RES
<222> LOCATION: (17)..(17)
<223> OTHER INFORMATION: Deamidated residue

<400> SEQUENCE: 117

Met Val Tyr Tyr Ala Asn Val Val Gly Gly Glu Val Asp Thr Asn His
1               5                   10                  15

Asn Glu Glu Asp Asp Glu Glu Pro Ile Pro Glu Ser Ser Glu Leu Thr
```

```
                    20                  25                  30

Leu Gln Glu Leu Leu Gly Glu Glu Arg
        35                  40

<210> SEQ ID NO 118
<211> LENGTH: 34
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (18)..(18)
<223> OTHER INFORMATION: Deamidated residue
<220> FEATURE:
<221> NAME/KEY: MOD_RES
<222> LOCATION: (21)..(21)
<223> OTHER INFORMATION: Deamidated residue

<400> SEQUENCE: 118

Asp Leu Leu Glu Tyr Glu Gly Asn Val Glu Asp Asp Met Met Ile Thr
1               5                   10                  15

Phe Gln Ile Ser Gln Thr Asp Leu Phe Gly Asn Pro Met Met Tyr Asp
            20                  25                  30

Leu Lys

<210> SEQ ID NO 119
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (3)..(3)
<223> OTHER INFORMATION: Oxidated residue
<220> FEATURE:
<221> NAME/KEY: MOD_RES
<222> LOCATION: (8)..(8)
<223> OTHER INFORMATION: Deamidated residue

<400> SEQUENCE: 119

Leu Glu Met Ile Ala Met Glu Asn Pro Ala Asp Leu Lys
1               5                   10

<210> SEQ ID NO 120
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 120

Met Ile Ile Ala Lys
1               5

<210> SEQ ID NO 121
<211> LENGTH: 34
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (14)..(14)
```

```
<223> OTHER INFORMATION: Oxidated residue
<220> FEATURE:
<221> NAME/KEY: MOD_RES
<222> LOCATION: (27)..(27)
<223> OTHER INFORMATION: Deamidated residue
<220> FEATURE:
<221> NAME/KEY: MOD_RES
<222> LOCATION: (29)..(30)
<223> OTHER INFORMATION: Oxidated residue

<400> SEQUENCE: 121

Asp Leu Leu Glu Tyr Glu Gly Asn Val Glu Asp Asp Met Met Ile Thr
1               5                   10                  15

Phe Gln Ile Ser Gln Thr Asp Leu Phe Gly Asn Pro Met Met Tyr Asp
            20                  25                  30

Leu Lys

<210> SEQ ID NO 122
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: Deamidated residue
<220> FEATURE:
<221> NAME/KEY: MOD_RES
<222> LOCATION: (5)..(5)
<223> OTHER INFORMATION: Deamidated residue

<400> SEQUENCE: 122

Asn Leu Asp Phe Gln Ala Leu Glu Glu Thr Thr Glu Tyr Asp Gly Gly
1               5                   10                  15

Tyr Thr Arg

<210> SEQ ID NO 123
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 123

Glu Asp Tyr Ser Pro Leu Ile Arg Val Ile Gly Arg Val Phe Ser Ser
1               5                   10                  15

Ala Glu Ala Leu Val Gln Ser Phe Arg
            20                  25

<210> SEQ ID NO 124
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (4)..(4)
<223> OTHER INFORMATION: Deamidated residue
<220> FEATURE:
<221> NAME/KEY: MOD_RES
<222> LOCATION: (12)..(12)
<223> OTHER INFORMATION: Deamidated residue

<400> SEQUENCE: 124
```

```
Glu Phe Phe Gln Leu Val Val Glu Glu Ile Phe Asn Pro Asp Ile Gly
1               5                   10                  15

Met Phe Thr Tyr Asp Glu Ser Thr Lys
                20                  25

<210> SEQ ID NO 125
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 125

Met Asp Asn Asn Ala Ala Ala Ile Lys
1               5

<210> SEQ ID NO 126
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (4)..(4)
<223> OTHER INFORMATION: Deamidated residue
<220> FEATURE:
<221> NAME/KEY: MOD_RES
<222> LOCATION: (12)..(12)
<223> OTHER INFORMATION: Deamidated residue
<220> FEATURE:
<221> NAME/KEY: MOD_RES
<222> LOCATION: (17)..(17)
<223> OTHER INFORMATION: Oxidated residue

<400> SEQUENCE: 126

Glu Phe Phe Gln Leu Val Val Glu Glu Ile Phe Asn Pro Asp Ile Gly
1               5                   10                  15

Met Phe Thr Tyr Asp Glu Ser Thr Lys
                20                  25
```